(12) United States Patent
Koo et al.

(10) Patent No.: US 12,514,567 B2
(45) Date of Patent: Jan. 6, 2026

(54) ULTRASOUND DIAGNOSIS APPARATUS AND METHOD OF GENERATING PULSE FOR GENERATING ULTRASONIC SIGNAL

(71) Applicant: SAMSUNG MEDISON CO., LTD., Gangwon-do (KR)

(72) Inventors: Hyun Soo Koo, Gangwon-do (KR); Jae You Kim, Gangwon-do (KR); Byung Sun Yu, Gangwon-do (KR)

(73) Assignee: SAMSUNG MEDISON CO., LTD., Gangwon-do (KR)

( * ) Notice: Subject to any disclaimer, the term of this patent is extended or adjusted under 35 U.S.C. 154(b) by 86 days.

(21) Appl. No.: 18/222,636

(22) Filed: Jul. 17, 2023

(65) Prior Publication Data

US 2024/0215958 A1 Jul. 4, 2024

(30) Foreign Application Priority Data

Dec. 29, 2022 (KR) ........................ 10-2022-0189913

(51) Int. Cl.
*A61B 8/00* (2006.01)

(52) U.S. Cl.
CPC .................. *A61B 8/54* (2013.01); *A61B 8/56* (2013.01); *A61B 8/58* (2013.01); *A61B 2560/0214* (2013.01); *A61B 2560/0238* (2013.01)

(58) Field of Classification Search
CPC .... A61B 8/54; A61B 8/56; A61B 8/58; A61B 2560/0214; A61B 2560/0238;
(Continued)

(56) References Cited

U.S. PATENT DOCUMENTS 8,951,196 B2 2/2015 Itoh
9,968,334 B2 5/2018 Park et al.
(Continued)

FOREIGN PATENT DOCUMENTS

CN 107966694 A * 4/2018 ............ G01N 29/30
JP 2009277376 A * 11/2009
(Continued)

OTHER PUBLICATIONS

Office Action issued Oct. 23, 2023 for counterpart European Patent Application No. 23172747.0.
(Continued)

*Primary Examiner* — Kaitlyn E Sebastian
(74) *Attorney, Agent, or Firm* — Morgan Lewis & Bockius LLP

(57) ABSTRACT

An ultrasound diagnosis apparatus according to an embodiment of the present disclosure may include a variable voltage supply unit configured to supply a driving voltage to the transmission circuit, a transmission circuit configured to generate a pulse signal for generating an ultrasonic signal using the driving voltage, and a controller configured to store compensation information for compensating for a voltage drop of the driving voltage and to provide a voltage control signal including information on a driving voltage for which the voltage drop is compensated for based on the compensation information to the variable voltage supply unit, wherein the variable voltage supply unit supplies the compensated driving voltage to the transmission circuit in response to the voltage control signal.

14 Claims, 17 Drawing Sheets

(58) Field of Classification Search
CPC . A61B 8/485; G01S 7/52022; G01S 7/52042; G01S 15/8915; B06B 2201/76; B06B 1/0207
See application file for complete search history.

(56) References Cited

U.S. PATENT DOCUMENTS

| | | | |
|---|---|---|---|
| 10,470,747 | B2 | 11/2019 | Kim et al. |
| 10,799,220 | B2 | 10/2020 | Ledoux et al. |
| 11,331,083 | B2 | 5/2022 | Lee et al. |
| 2015/0148672 | A1 | 5/2015 | Savord et al. |
| 2015/0182201 | A1* | 7/2015 | Steinbacher ........... G01R 21/06 600/459 |
| 2016/0095582 | A1 | 4/2016 | Iwama et al. |
| 2017/0290704 | A1* | 10/2017 | Mercado ............. A61F 9/00736 |
| 2019/0110777 | A1* | 4/2019 | Lee .................... G01S 7/52042 |

FOREIGN PATENT DOCUMENTS

| | | |
|---|---|---|
| JP | 2015-58251 A | 3/2015 |
| JP | 6158010 B2 | 7/2017 |
| JP | 7242240 B2 | 3/2023 |
| KR | 10-1381166 B1 | 3/2014 |
| KR | 10-2015-0014315 A | 2/2015 |
| KR | 10-1626507 B1 | 5/2016 |
| KR | 10-2019-0042427 A | 4/2019 |
| KR | 10-2030567 B1 | 10/2019 |
| KR | 10-2457219 B1 | 10/2022 |

OTHER PUBLICATIONS

Notice of Allowance dated Nov. 4, 2024, issued in corresponding European Patent Application No. 23172747.0.

* cited by examiner

| Measurement condition 1 | Compensation information 1 |
|---|---|
| Measurement condition 2 | Compensation information2 |
| Measurement condition 3 | Compensation information 3 |
| Measurement condition4 | Compensation information4 |
| Measurement condition 5 | Compensation information 5 |
| ⋮ | ⋮ |

ULTRASOUND DIAGNOSIS APPARATUS AND METHOD OF GENERATING PULSE FOR GENERATING ULTRASONIC SIGNAL

CROSS-REFERENCE TO RELATED APPLICATION

The present application claims priority under 35 U.S.C. § 119(a) to Korean patent application number 10-2022-0189913 filed on Dec. 29, 2022, in the Korean Intellectual Property Office, the entire disclosure of which is incorporated by reference herein.

BACKGROUND

1. Technical Field

The present invention relates to an ultrasound diagnosis apparatus and an operation method thereof.

2. Related Art

An ultrasound diagnosis apparatus radiates an ultrasonic signal generated from a transducer of a probe to an object, receives information of an echo signal reflected from the object, and obtains an image of an internal part of the object. In particular, ultrasound diagnosis apparatuses are used for medical purposes such as observing the inside of a subject, detecting foreign substances, and measuring injuries. Compared to diagnostic apparatuses using X-rays, such an ultrasound diagnosis apparatus has advantages such as higher stability, real-time image display, and safety due to no radiation exposure, and thus is widely used together with other imaging diagnosis apparatuses.

In a mode requiring a high voltage, for example, a 2D shear wave elastography mode, the ultrasound apparatus may require a power supply unit for stably supplying a high voltage of a constant magnitude to a transceiver circuit included in the ultrasound diagnosis apparatus. Since a large amount of power is provided to the transceiver circuit for a long time, the power output from the power supply unit may gradually decrease over time. In this case, since sufficient power is not supplied to the transceiver circuit to generate the pulse, distortion may occur in the pulse generated by the transceiver circuit.

SUMMARY

A technical object to be achieved by the present disclosure is to provide an ultrasound diagnosis apparatus including a power supply unit capable of stably supplying a high voltage in a diagnosis mode of the ultrasound apparatus requiring high power, and an operation method thereof.

In accordance with an aspect of the present disclosure, there is provided an ultrasound diagnosis apparatus, including a variable voltage supply unit configured to supply a driving voltage, a transmission circuit configured to generate a pulse signal for generating an ultrasonic signal using the driving voltage, and a controller configured to store compensation information for compensating for a voltage drop of the driving voltage and to provide a voltage control signal including information on a driving voltage for which the voltage drop is compensated for based on the compensation information to the variable voltage supply unit, wherein the variable voltage supply unit may be configured to supply the compensated driving voltage to the transmission circuit in response to the voltage control signal.

In an embodiment, the controller may be configured to provide a test control signal including information on a test voltage having a predetermined voltage magnitude and a predetermined duration to the variable voltage supply unit, and generate the compensation information based on the test voltage output from the variable voltage supply unit according to the test control signal, and the variable voltage supply unit may be configured to generate the test voltage in response to the test control signal and then output the test voltage to the controller.

In an embodiment, the compensation information may include information on a time point at which the test voltage starts to drop from the predetermined voltage magnitude, information on an amount of voltage drop of the test voltage, and information on an amount of change (slope) of the test voltage over time.

In an embodiment, wherein the information on the compensated driving voltage may include information on a target level of the compensated driving voltage, information on a duration for which the compensated driving voltage is supplied to the transmission circuit, information on a voltage rising time point at which the compensated driving voltage starts to rise from the target level, information on a time point at which a level of the compensated driving voltage decreases to the target level again, information on an amount of voltage rise of the compensated driving voltage, and information on an amount of change (slope) of the compensated driving voltage over time.

In an embodiment, a length of the duration for which the compensated driving voltage is supplied to the transmission circuit may be the same as a length of the predetermined duration.

In an embodiment, the controller may include a compensation information storage unit configured to store the compensation information and a control signal generating unit configured to receive the compensation information from the compensation information storage unit and generate the voltage control signal including the information on the compensated driving voltage.

In an embodiment, the controller may be configured to repeatedly provide the test control signal to the variable voltage supply unit, and generate a plurality of pieces of compensation information corresponding to the number of times the test control signal is provided and store in the compensation information storage unit, and the control signal generating unit may be configured to receive the plurality of pieces of compensation information from the compensation information storage unit, calculate an average value or a median value of the plurality of pieces of compensation information, and generate information on the compensated driving voltage based on the average value or the median value.

The ultrasound diagnosis apparatus according to an embodiment may further include an input unit configured to receive a user's input and provide a command signal corresponding to the user's input to the controller, wherein the input unit may include a mode selection unit configured to allow the user to select any one mode of a first operation mode and a second operation mode in which power higher than that of the first operation mode is used, and the controller may be configured to perform an operation of generating the compensation information in response to a command signal corresponding to the second operation mode provided from the input unit.

In an embodiment, the input unit may further include a parameter setting unit capable of changing a plurality of parameters related to the generation of the ultrasonic signal by the user's input, wherein the controller may be configured to, in the second operation mode, perform the operation of generating the compensation information whenever at least one of the plurality of parameters is changed by the user.

In an embodiment, the variable voltage supply unit may include a high voltage generation unit configured to receive an input voltage input from an outside and boost the input voltage to a first voltage equal to or higher than levels of the test voltage and the compensated driving voltage, a voltage stabilization unit configured to drop or stabilize the first voltage received from the high voltage generation unit to generate a second voltage having the same magnitude as the test voltage and the compensated driving voltage, and a voltage controller configured to control the high voltage generation unit and the voltage stabilization unit based on the test control signal or the voltage control signal received from the controller, wherein the voltage controller may be configured to control the high voltage generation unit and the voltage stabilization unit so that the magnitude of the first voltage and the magnitude of the second voltage gradually rise from a time point corresponding to the voltage rising time point based on the voltage control signal.

In an embodiment, the controller may include a compensation information storage unit in which the compensation information is stored, and the compensation information may include a plurality of measurement conditions for transmitting an ultrasonic signal for an object and the compensation information for each of the plurality of measurement conditions.

In an embodiment, the apparatus may further include an input unit including a parameter setting unit capable of setting or changing a plurality of parameters related to the generation of the ultrasonic signal by a user's input, and the controller may further include a control signal generating unit configured to receive compensation information for, among the plurality of measurement conditions stored in the compensation information storage unit, a measurement condition corresponding to the plurality of parameters set or changed by the user's input from the compensation information storage unit, and to generate information on the compensated driving voltage.

In accordance with another aspect of the present disclosure, there is provided a method of generating a pulse signal for generating an ultrasonic signal, including storing compensation information for compensating for a voltage drop of a driving voltage, generating information on a driving voltage for which the voltage drop is compensated for based on the compensation information, generating a compensated driving voltage based on the information on the compensated driving voltage; and generating the pulse signal using the compensated driving voltage.

In an embodiment, the generating of the compensation information may include providing a test control signal including information on a test voltage having a predetermined voltage magnitude and a predetermined duration to a variable voltage supply unit, and generating the compensation information based on the test voltage output from the variable voltage supply unit according to the test control signal.

In an embodiment, the compensation information may include information on a time point at which the test voltage starts to drop from the predetermined voltage magnitude, information on an amount of voltage drop of the test voltage, and information on an amount of change (slope) of the test voltage over time.

In an embodiment, wherein the information on the compensated driving voltage may include information on a target magnitude of the compensated driving voltage, information on a duration for which the compensated driving voltage is supplied to a transmission circuit generating the pulse signal, information on a voltage rising time point at which the compensated driving voltage starts to rise from the target magnitude, information on an amount of voltage rise of the compensated driving voltage, and information on an amount of change (slope) of the compensated driving voltage over time.

In an embodiment, a length of the duration for which the compensated driving voltage is supplied to the transmission circuit may be the same as a length of the predetermined duration.

In an embodiment, the providing of the test control signal to the variable voltage supply unit may include repeatedly providing the test control signal to the variable voltage supply unit, the generating of the compensation information based on the test voltage output from the variable voltage supply unit may include generating a plurality of pieces of compensation information corresponding to the number of times the test control signal is provided, and the generating of the information on the driving voltage for which the voltage drop is compensated for may include calculating an average value or a median value of the plurality of pieces of compensation information, and generating information on the compensated driving voltage based on the average value or the median value.

In an embodiment, the storing of the compensation information may include storing a plurality of measurement conditions for transmitting an ultrasonic signal for an object and the compensation information for each of the plurality of measurement conditions in a compensation information storage unit.

The method of generating a pulse signal for generating an ultrasonic signal according to an embodiment may further include receiving a user's input for setting or changing a plurality of parameters related to the generation of the ultrasonic signal, wherein the generating of the information on the compensated driving voltage includes, by receiving compensation information for, among the plurality of measurement conditions stored in the compensation information storage unit, a measurement condition corresponding to the plurality of parameters set or changed by the user's input from the compensation information storage unit, generating information on the compensated driving voltage corresponding to the set or changed plurality of parameters.

According to an embodiment of the present disclosure, when a voltage drop occurs in the diagnostic mode of an ultrasound apparatus that requires high power, the amount of voltage drop over time may be measured in advance, the information may be stored, and the drop in voltage supplied to the transceiver circuit of the ultrasound apparatus may be compensated in advance according to the measured information.

Accordingly, high voltage may be stably supplied to the transceiver circuit in the ultrasound diagnosis apparatus.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
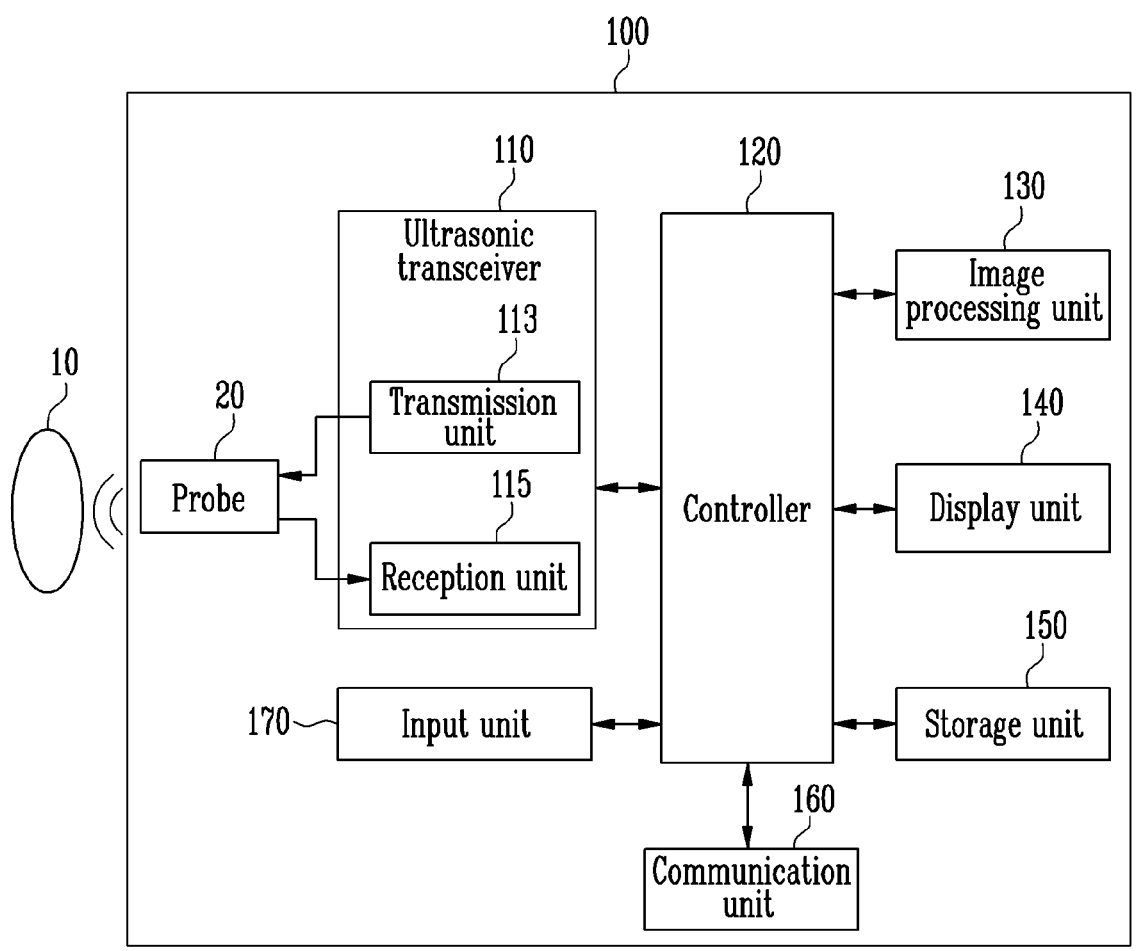
FIG. 1 is a block diagram illustrating a configuration of an ultrasound diagnosis apparatus.

The present specification describes the principles of the present invention and discloses embodiments such that the scope of the present invention may be clarified and those skilled in the art to which the present invention pertains may implement the present invention. The disclosed embodiments may be implemented in various forms.

Throughout the specification, when a part is "connected" to another part, it includes not only a case of being directly connected but also a case of being indirectly connected, and the indirect connection includes connection through a wireless communication network.

In addition, terms used herein are used to describe the embodiments, not intended to limit and/or restrict the disclosed invention. The singular expression includes the plural expression unless the context clearly dictates otherwise. In the present specification, terms such as "comprise" or "have" specify the presence of stated features, integers, steps, operations, elements, components or a combination thereof, but do not preclude the presence or addition of one or more other features, integers, steps, operations, elements, components, a combination thereof.

Further, although terms including ordinal numbers such as "first," "second," and the like are used to explain various components, the components are not limited to such terms and these terms are used only to distinguish one component from another component. For example, a first component may be referred to as a second component, or similarly, the second component may be referred to as the first component within the scope of the present disclosure.

In addition, terms such as "unit", "group", "block", "member", and "module" may refer to a unit that processes at least one function or operation. For example, the terms may refer to at least one process processed by at least one hardware such as a field-programmable gate array (FPGA)/ application specific integrated circuit (ASIC), at least one software stored in a memory, or a processor.

Symbols given to each step are used to identify each step, and these signs do not indicate the order between the steps, and each step may be performed differently from the stated order unless the context clearly indicates a specific order.

In the present specification, an "image" may include a medical image obtained by a medical imaging apparatus such as a magnetic resonance imaging (MRI) device, a computed tomography (CT) device, an ultrasound imaging device, and an X-ray imaging device.

In the present specification, an "object" is to be photographed and may include a person, an animal, or a part thereof. For example, the object may include a part (organ) of a human body, a phantom, or the like.

Throughout the specification, an "ultrasonic image" means an image of the object, which is processed based on an ultrasonic signal transmitted to the object and reflected from the object.

Hereinafter, the embodiments will be described in detail with reference to the accompanying drawings.

FIG. 1 is a block diagram illustrating a configuration of an ultrasound diagnosis apparatus.

An ultrasound diagnosis apparatus 100 may include a probe 20, an ultrasonic transceiver 110, a controller 120, an image processing unit 130, a display unit 140, a storage unit 150, a communication unit 160, and an input unit 170.

The ultrasound diagnosis apparatus 100 may be implemented as a portable type as well as a cart type. Examples of a portable ultrasound diagnosis apparatus may include a smart phone, a laptop computer, a personal digital assistant (PDA), a tablet personal computer (PC), and the like including a probe and an application, but the present invention is not limited thereto.

The probe 20 may include a plurality of transducers. The plurality of transducers may transmit ultrasonic signals to an object 10 according to a transmission signal applied from a transmission unit 113. The plurality of transducers may receive ultrasonic signals reflected from the object 10 to form a reception signal. Further, the probe 20 may be implemented integrally with the ultrasound diagnosis apparatus 100 or may be implemented as a separate type in which the probe 20 is connected to the ultrasound diagnosis apparatus 100 in a wired or wireless manner. Further, the ultrasound diagnosis apparatus 100 may include one or more probes 20 according to an implementation form. According to an embodiment, the probe 20 may be referred to as an ultrasonic probe 20.

The controller 120 controls the transmission unit 113 to form a transmission signal to be applied to each of the plurality of transducers in consideration of the positions and focal points of the plurality of transducers included in the probe 20.

The controller 120 controls a reception unit 115 to convert a reception signal received from the probe 20 in an analog-to-digital conversion manner and to sum the digitally converted reception signal in consideration of the positions and focal points of the plurality of transducers, thereby generating ultrasonic data.

The image processing unit 130 generates an ultrasonic image using the ultrasonic data generated by the ultrasonic reception unit 115.

The display unit 140 may display the generated ultrasonic image and various pieces of information processed by the ultrasound diagnosis apparatus 100. The ultrasound diagnosis apparatus 100 may include one or more display units 140 according to an implementation form. Further, the display unit 140 may be implemented as a touch screen in combination with a touch panel.

The controller 120 may control the overall operation of the ultrasound diagnosis apparatus 100 and a signal flow between internal components of the ultrasound diagnosis apparatus 100. The controller 120 may include a memory that stores a program or data for performing a function of the ultrasound diagnosis apparatus 100 and a processor that processes the program or data. Further, the controller 120 may control the operation of the ultrasound diagnosis apparatus 100 by receiving a control signal from the input unit 170 or an external device.

The ultrasound diagnosis apparatus 100 may include the communication unit 160 and may be connected, through the communication unit 160, to an external device (for example, a server, a medical device, a portable device (a smart phone, a tablet PC, a wearable device, and the like)).

The communication unit 160 may include one or more components enabling communication with the external device and may include, for example, at least one of a short-range communication module, a wired communication module, and a wireless communication module.

The communication unit 160 may receive a control signal and data from the external device and transmit the received control signal to the controller 120 so that the controller 120 may control the ultrasound diagnosis apparatus 100 in response to the received control signal.

Alternatively, the controller 120 may transmit a control signal to the external device through the communication unit 160 so that the external device may be controlled in response to the control signal of the controller 120.

For example, the external device may process the data of the external device in response to the control signal of the controller received through the communication unit.

A program capable of controlling the ultrasound diagnosis apparatus 100 may be installed in the external device, and the program may include instructions for performing some or all of the operations of the controller 120.

The program may be installed in the external device in advance or may be installed by a user of the external device by downloading the program from a server that provides applications. The server that provides applications may include a recording medium in which the corresponding program is stored.

In addition, the program may include a storage medium of a server or a storage medium of a client device in a system consisting of a server and a client device. Alternatively, if there is a third device (smartphones, tablet PCs, wearable devices, etc.) that is communicatively connected to the server or client device, the program product may include a storage medium of the third device. Alternatively, the program may include a S/W program itself transmitted from the server to the client device or the third device, or transmitted from the third device to the client device.

In this case, one of the server, the client device, and the third device may execute the program to perform methods according to the disclosed embodiments. Alternatively, two or more of the server, the client device, and the third device may execute the program to perform the methods according to the disclosed embodiments by distributing the methods.

For example, a server (e.g., a cloud server or an artificial intelligence server, etc.) may execute a program stored in the server, so as to control the client device that is communicatively connected to the server to perform the method according to the disclosed embodiments.

The storage unit 150 may store various types of data or programs for driving and controlling the ultrasound diagnosis apparatus 100, input/output ultrasonic data, acquired ultrasonic images, and the like.

The input unit 170 may receive a user's input to control the ultrasound diagnosis apparatus 100. For example, the user's input may include an input for manipulating a button, a keypad, a mouse, a trackball, a jog switch, a knob, or the like, an input for touching a touchpad or a touch screen, a voice input, a motion input, and a bioinformation input (e.g., iris recognition or fingerprint recognition), but the present disclosure is not limited thereto.

An example of the ultrasound diagnosis apparatus 100 according to an embodiment will be described below with reference to FIGS. 2A to 2C.

Figure 2A:
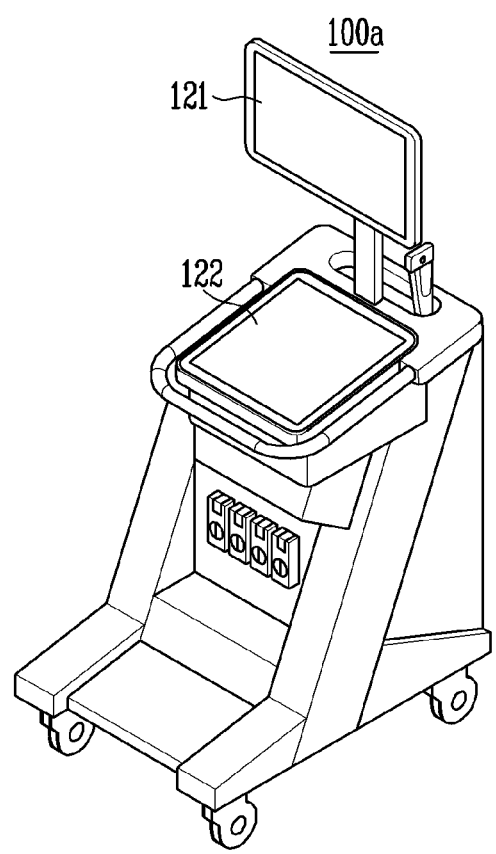
FIG. 2A to FIG. 2C are diagrams illustrating an ultrasound diagnosis apparatus.
Figure 2B:
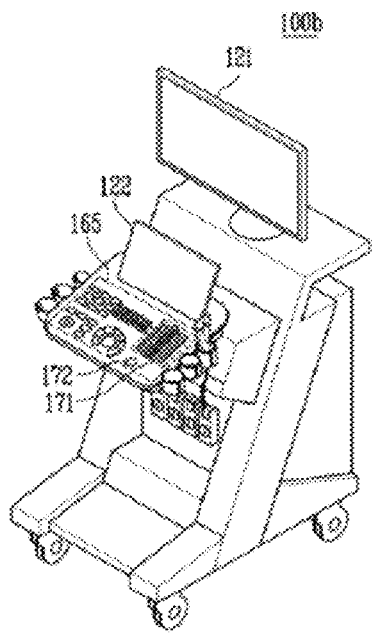

FIG. 2A to FIG. 2B are diagrams illustrating an ultrasound diagnosis apparatus.

Referring to FIGS. 2A and 2B, ultrasound diagnosis apparatuses 100a and 100b may each include a main display unit 121 and a sub display unit 122. One of the main display unit 121 and the sub display unit 122 may be implemented as a touch screen. The main display unit 121 and the sub display unit 122 may display the ultrasonic image or various pieces of information processed by the ultrasound diagnosis apparatuses 100a and 100b. Further, the main display unit 121 and the sub display unit 122 may be implemented as a touch screen and provide a graphical user interface (GUI) to receive data for controlling the ultrasound diagnosis apparatuses 100a and 100b from a user. For example, the main display unit 121 may display the ultrasonic image, and the sub display unit 122 may display a control panel for controlling the ultrasonic image in the form of the GUI. The sub display unit 122 may receive data for controlling the displaying of the image through the control panel displayed in the form of the GUI. The ultrasound diagnosis apparatuses 100a and 100b may control, using input control data, the displaying of the ultrasonic image displayed on the main display unit 121.

Referring to FIG. 2B, the ultrasound diagnosis apparatus 100b may further include a control panel 165 in addition to the main display unit 121 and the sub display unit 122. The control panel 165 may include a button, a trackball, a jog switch, a knob, and the like, and may receive data for controlling the ultrasound diagnosis apparatus 100b from the user. For example, the control panel 165 may include a time gain compensation (TGC) button 171, a freeze button 172, and the like. The TGC button 171 is a button for setting a TGC value for each depth of the ultrasonic image. Further, when detecting the input of the freeze button 172 while scanning the ultrasonic image, the ultrasound diagnosis apparatus 100b may maintain a state in which a frame image at a corresponding time point is displayed.

Meanwhile, inputs of the button, the trackball, the jog switch, the knob, and the like included in the control panel 165 may be provided to the GUI in the main display unit 121 or the sub display unit 122.

Figure 2C:
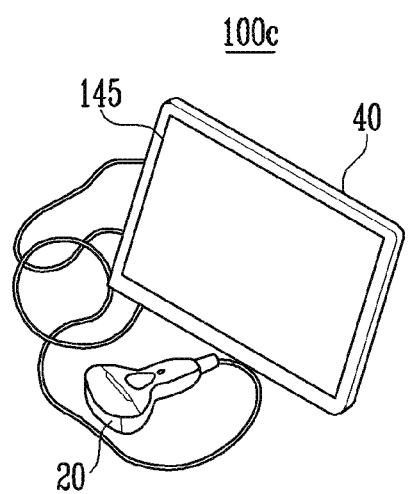

Referring to FIG. 2C, the ultrasound diagnosis apparatus 100c may be implemented as a portable type. Examples of a portable ultrasound diagnosis apparatus 100c may include a smart phone, a laptop computer, a PDA, a tablet PC, and the like including a probe and an application, but the present invention is not limited thereto.

The ultrasound diagnosis apparatus 100c may include the probe 20 and a main body 40, and the probe 20 may be connected to one side of the main body 40 in a wired or wireless manner. The main body may include a touch screen 145. The touch screen 145 may display the ultrasonic image, various pieces of information processed by the ultrasound diagnosis apparatus, the GUI, and the like.

Meanwhile, the disclosed embodiments may be implemented through recording media having stored therein computer-executable instructions. The instructions may be stored in the form of program codes, and when executed by processor, generate a program module to perform operations of the disclosed embodiments. The recording medium may be implemented as a computer-readable recording medium.

Computer-readable recording media include all types of recording media in which instructions that can be decoded by a computer are stored. For example, there may be read only memory (ROM), random access memory (RAM), a magnetic tape, a magnetic disk, a flash memory, an optical data storage device, and the like.

Figure 3A:
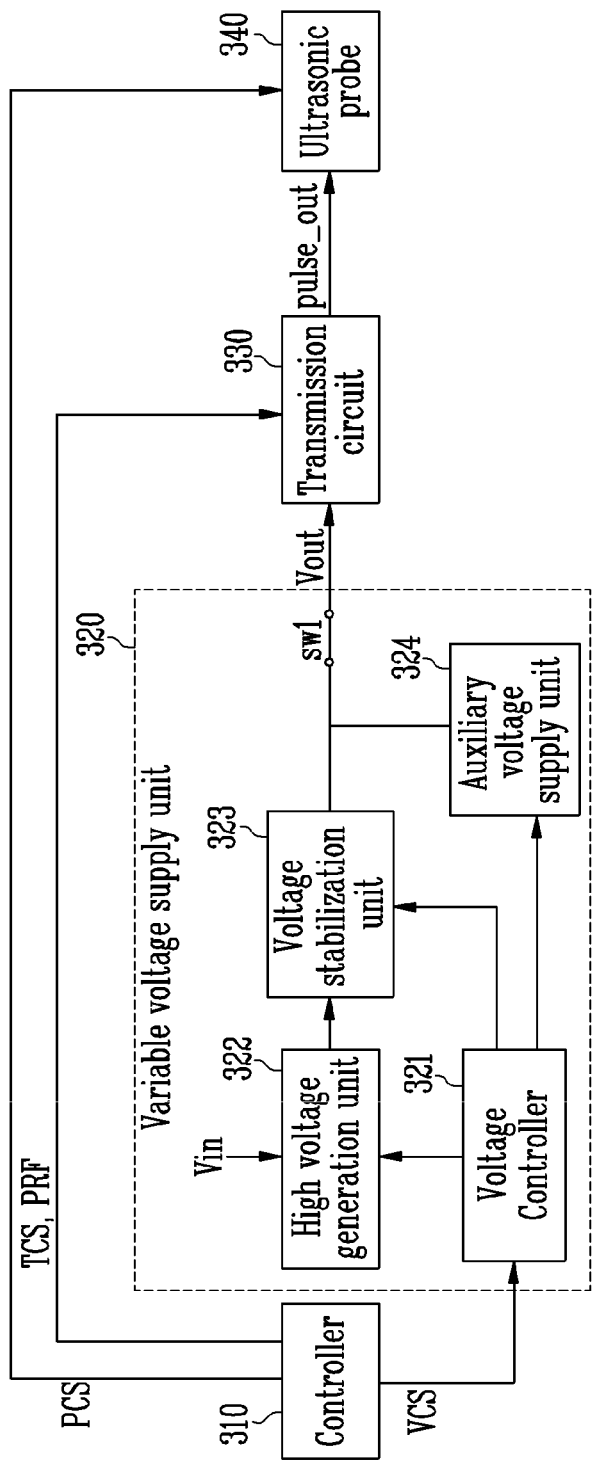
FIG. 3A and FIG. 3B are diagrams for specifically illustrating a configuration of an ultrasound diagnosis apparatus in accordance with an embodiment.
Figure 3B:
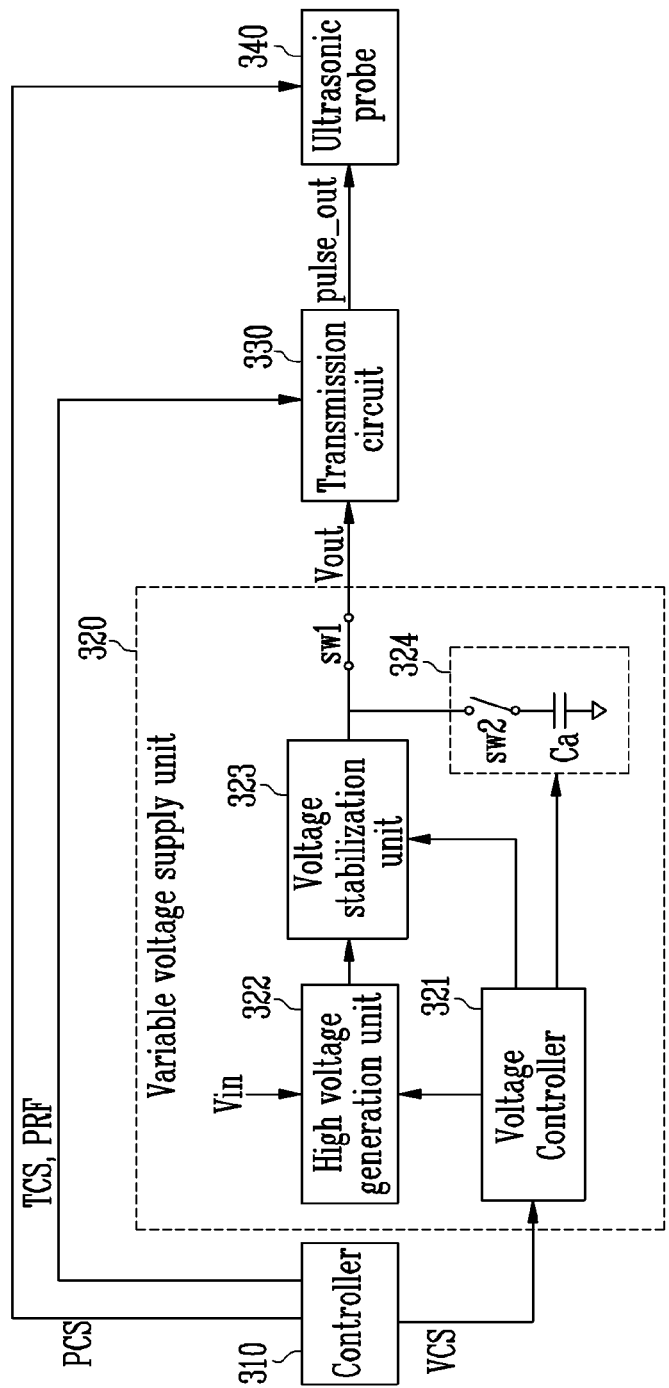

FIG. 3A and FIG. 3B are diagrams for specifically illustrating a configuration of an ultrasound diagnosis apparatus in accordance with an embodiment.

Referring to FIGS. 3A and 3B, the ultrasound diagnosis apparatus according to the embodiment may include a controller 310, a variable voltage supply unit 320, a transmission circuit 330, and an ultrasonic probe 340. The controller 310 and the ultrasonic probe 340 of FIGS. 3A and 3B may have the same configuration as the controller 120 and the probe 20 of FIG. 1, respectively. The transmission circuit 330 of FIGS. 3A and 3B may have the same configuration as the transmission unit 113 of FIG. 1 or may be a configuration included in the transmission unit 113.

Referring to FIGS. 3A and 3B, the controller 310 may control the variable voltage supply unit 320, the transmission circuit 330, and the ultrasonic probe 340 included in the ultrasound diagnosis apparatus. To this end, the controller 310 may generate control signals and provide the control signals to the variable voltage supply unit 320, the transmission circuit 330, and the ultrasonic probe 340, respectively.

In an embodiment, the controller 310 may provide a voltage control signal VCS to the variable voltage supply unit 320. The voltage control signal VCS may include information on the driving voltage and a clock signal. The driving voltage may be a voltage supplied from the variable voltage supply unit 320 to the transmission circuit 330. The information on the driving voltage may include information on the magnitude of the driving voltage and information on the supply time of the driving voltage. In an embodiment, the voltage control signal VCS may include information on the compensated driving voltage. Information on the compensated driving voltage may be information for compensating for a voltage drop that may occur while driving the ultrasound diagnosis apparatus.

The controller 310 may provide a transmission control signal TCS and a pulse repetition frequency signal PRF to the transmission circuit 330. The transmission control signal TCS may include information on the amplitude of the driving pulse signal (pulse_out) supplied from the transmission circuit 330 to the ultrasonic probe 340, information on the width of the driving pulse signal (pulse_out) and information on the number of repetitions of the driving pulse signal (pulse_out) and a clock signal. The PRF may include a plurality of signals repeated at a predetermined period. Based on each signal, the time point at which the pulse signal (pulse_out) is supplied from the transmission circuit 330 to the ultrasonic probe 340 may be controlled. For example, the pulse signal (pulse_out), at the time point corresponding to the foiling edge of each signal included in the pulse repetition frequency signal PRF, may be generated in the transmission circuit 330 provided to the ultrasonic probe 340.

The controller 310 may generate a probe control signal PCF and provide it for the ultrasonic probe 340. The probe control signal PCF may be a signal for controlling the operation of the ultrasonic probe 340.

The variable voltage supply unit 320 may include a voltage controller 321, a high voltage generation unit 322, a voltage stabilization unit 323, and an auxiliary voltage supply unit 324. In an embodiment, the variable voltage supply unit 320 may further include a first switch sw1. Based on the voltage control signal VCS received from the controller 310, the voltage controller 321 may control the high voltage generation unit 322, the voltage stabilization unit 323 and the auxiliary voltage supply unit 324 so that the driving voltage is supplied to the transmission circuit 330.

According to the control of the voltage controller 322, the high voltage generation unit 322 may boost the input voltage (Vin) provided from the outside to a first voltage which is the same or higher as the level of the driving voltage. For example, the high voltage generation unit 322 may include a hv generator or a DC-DC converter. The high voltage generation unit 322 may supply the first voltage to the voltage stabilization unit 323 according to the control of the voltage controller 321.

The voltage stabilization unit 323 may drop or stabilize the first voltage received from the high voltage generation unit 322 to generate a second voltage of the same magnitude as the driving voltage. For example, the voltage stabilization unit 323 may include a low drop out (LDO) regulator. The voltage stabilization unit 323 may supply the second voltage to the transmission circuit 330 according to the control of the voltage controller 321.

The auxiliary voltage supply unit 324 may be a configuration for reliably supplying high voltage to the transmission circuit 330 in the diagnostic mode of the ultrasound apparatus that requires high power. Referring to FIG. 3B, in an embodiment, the auxiliary voltage supply unit 324 may include at least one capacitor Ca, and a second switch sw2. According to the control of the voltage controller 321, the auxiliary voltage supply unit 324 may charge the voltage to the capacitor Ca, or supply the auxiliary voltage to the transmission circuit 330, along with the second voltage output from the voltage stabilization unit 323.

For example, in the diagnostic mode of an ultrasound diagnosis apparatus requiring high power, the first switch sw1 and the second switch sw2 may be turned on. In this case, an auxiliary voltage from the auxiliary voltage supply unit 324 together with the second voltage may be supplied to the transmission circuit 330. In the diagnostic mode of the ultrasound diagnosis apparatus that does not require high power, the second switch sw2 may be turned off. In this case, the auxiliary voltage supply unit 324 may not supply the auxiliary voltage to the transmission circuit 330.

When a voltage supply to the transmission circuit 330 is not required, the capacitor Ca included in the auxiliary voltage supply unit 324 may be charged. For example, when the transmission circuit 330 outputs a plurality of pulse signals (pulse_out) to the ultrasonic probe 340 every predetermined period, the capacitor Ca can be charged during the time between the output of one pulse signal (pulse_out) and the next pulse signal (pulse_out). In this case, the first switch sw1 may be turned off, and the second switch sw2 may be turned on.

In FIGS. 3A and 3B, although the variable voltage supply unit 320 is shown to include a high voltage generation unit 322, a voltage stabilization unit 323, and an auxiliary voltage supply unit 324, in an embodiment, the configuration included in the variable voltage supply unit 320 may be changed in various ways. For example, the voltage stabilization unit 323 or the auxiliary voltage supply unit 324 may be omitted. For example, the voltage stabilization unit 323 may be omitted and two or more high voltage generation units 322 may be included.

The transmission circuit 330 may generate at least one pulse signal (pulse_out) using the output voltage (Vout) according to the transmission control signal TCS and a pulse repetition frequency signal PRF received from the controller 310, and provide it to the ultrasonic probe 340. The output voltage (Vout) may be the second voltage output from the voltage stabilization unit 323, or the sum voltage of the second voltage and the auxiliary voltage supplied from the auxiliary voltage supply unit.

The ultrasonic probe 340 may generate ultrasonic signals using the pulse signal (pulse_out) and output them to the target object according to a probe control signal PCS received from the controller 310.

Figure 4:
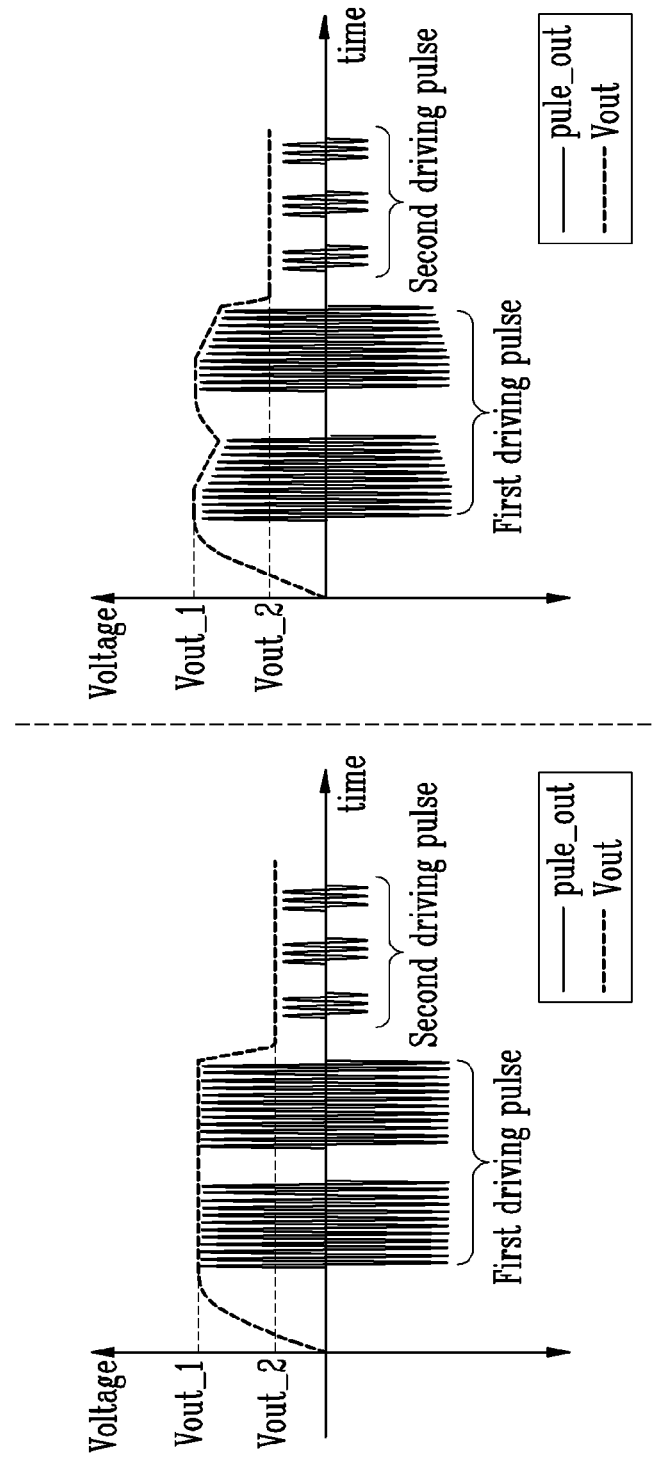
FIG. 4 is a diagram for illustrating a phenomenon in which an output voltage output from a variable voltage supply unit of FIGS. 3A and 3B to a transmission circuit drops over time.

FIG. 4 is a diagram for illustrating a phenomenon in which an output voltage output from a variable voltage supply unit of FIGS. 3A and 3B to a transmission circuit drops over time.

In FIG. 4, the left graph illustrates the output voltage (Vout) output from the variable voltage supply unit and the pulse signal (pulse_out) output from the transmission circuit in the ideal case. In FIG. 4, the right graph illustrates the output voltage (Vout) output from the variable voltage supply unit and the pulse signal (pulse_out) output from the transmission circuit, considering the power consumption of the configurations included in the variable voltage supply unit.

In the left and right graphs of FIG. 4, the pulse signal (pulse_out) output from the transmission circuit may be a pulse output from the transmission circuit in a diagnostic mode requiring high power.

The diagnostic mode requiring high power may be, for example, a 2D shear wave elastography mode. In the 2D shear wave elastography mode, the ultrasonic probe may irradiate the object with a push pulse which is an ultrasonic signal. A shear wave may occur at the location where the push pulse is irradiated in the object. The ultrasonic probe may receive the shear wave and measure the elastic specificity of the object based on this.

In FIG. 4, the first driving pulse may be a pulse signal output from the transmission circuit to the ultrasonic probe to generate a push pulse by the ultrasonic probe in the 2D shear wave elastography mode. The second drive pulse may be a pulse signal output from the transmission circuit to the ultrasonic probe to measure the shear wave generated inside the object by the ultrasonic probe in the 2D shear wave elastography mode. In the 2D shear wave elastography mode, the push pulse for generating shear wave inside the object may require relatively high energy. Thus, a high level of voltage may be required for the transmission circuit to generate the first driving pulse.

In order to generate the first driving pulse in the transmission circuit, a first output voltage (Vout_1) may be supplied from the variable voltage supply unit. In order to generate a second driving pulse in the transmission circuit, a second output voltage (Vout_2) may be supplied from the variable voltage supply unit.

Referring to the left graph of FIG. 4, in an ideal case, while the first driving pulse is generated and output, the levels of the first output voltage (Vout_1) and the second output voltage (Vout_2) may be kept constant.

Referring to the right graph of FIG. 4, the magnitude of the first output voltage (Vout_1) output from the actual transmission circuit may gradually decrease after a certain period of time after the first driving pulse is first generated. This may be due to the fact that a large amount of power is consumed over a long period of time in the components included in the variable voltage supply unit (such as auxiliary voltage supply unit and high voltage generation unit) when the ultrasound diagnosis apparatus operates in the 2D shear wave elastography mode. In the case of the second driving pulse, since the amplitude and width of the pulse are relatively short, the level of the second output voltage (Vout_2) may be kept constant without being reduced.

Figure 5A:
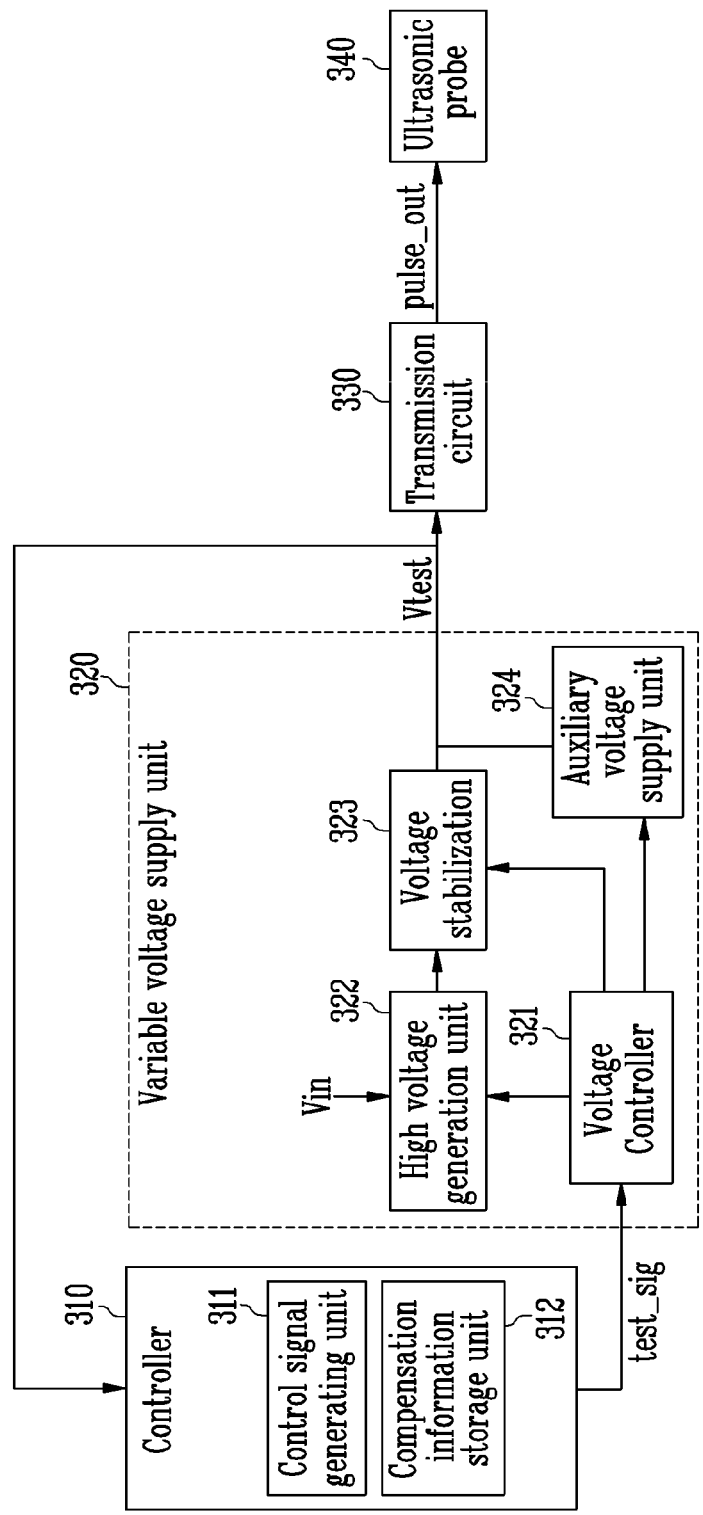
FIGS. 5A and 5B are diagrams for illustrating an operation of an ultrasound apparatus in accordance with an embodiment.
Figure 5B:
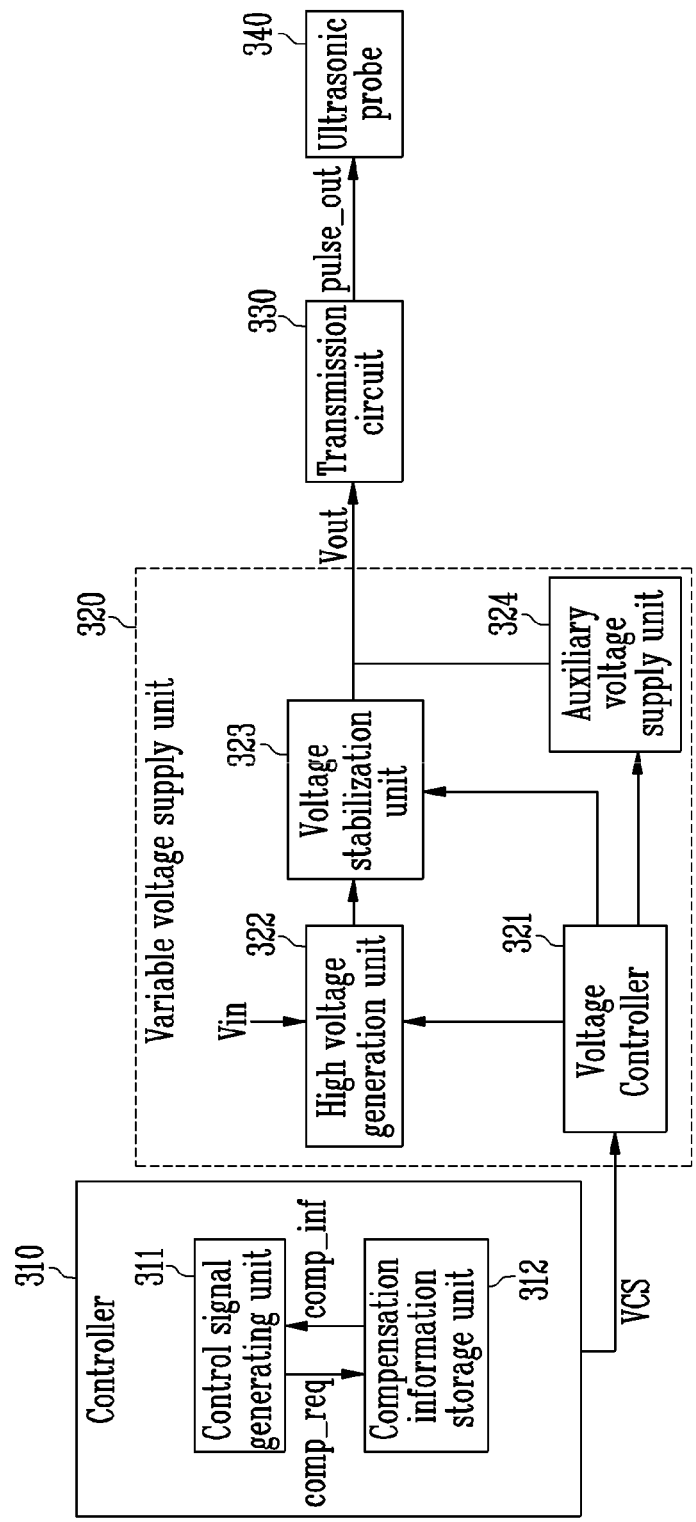

FIGS. 5A and 5B are diagrams for illustrating an operation of an ultrasound apparatus in accordance with an embodiment.

The ultrasound diagnosis apparatus according to an embodiment may generate compensation information for compensating for the drop in the output voltage described in FIG. 4, and output a compensated driving voltage based on the generated compensation information.

Referring to FIG. 5A, the control signal generating unit 311 included in the controller 310 may generate a test control signal (test_sig) including information on the test voltage (Vtest) and provide it to the variable voltage supply unit 320. The information on the test voltage (Vtest) may include information on the level and duration of the test voltage (Vtest). The level and duration of the test voltage (Vtest) may be set in advance, and the corresponding information may be stored in a separate register (not shown).

The variable voltage supply unit 320 may generate and output a test voltage (Vtest) in response to the test control signal (test_sig) received from the controller 310. Specifically, the voltage controller 321 included in the variable voltage supply unit 320 may control the high voltage generation unit 322, the voltage stabilization unit 323, and the auxiliary voltage supply unit 324 based on information on the test voltage (Vtest) included in the test control signal (test_sig). The high voltage generation unit 322, the voltage stabilization unit 323, and the auxiliary voltage supply unit 324 may generate and output a test voltage (Vtest) according to the control of the voltage controller 321.

Referring to FIG. 5B, the controller 310 may generate a voltage control signal VCS including information on the compensated driving voltage based on the compensation information (comp_inf) included in the compensation information storage unit 312, and provide it to the variable voltage supply unit 320. Specifically, the control signal generating unit 311 may provide a compensation information request signal (comp_sig) to the compensation information storage unit 312. The compensation information storage unit 312 may provide the compensation information (comp_inf) to the control signal generating unit 311 in response to the compensation information request signal (comp_sig). The control signal generating unit 311 may generate a voltage control signal VCS including information on the compensated driving voltage based on the compensation information (comp_inf). The controller 310 may provide the generated voltage control signal VCS to the variable voltage supply unit.

According to the embodiment described through FIGS. 5A and 5B, the ultrasound diagnosis apparatus may generate the compensation information based on the test voltage Vtest output from the variable voltage supply unit 320, and based on the compensation information comp_inf, may provide the driving voltage compensated for the voltage drop to the transmission circuit 330. Accordingly, the voltage drop of the driving voltage may be compensated so that the driving pulse can be stably output from the transmission circuit 330.

Figure 6A:
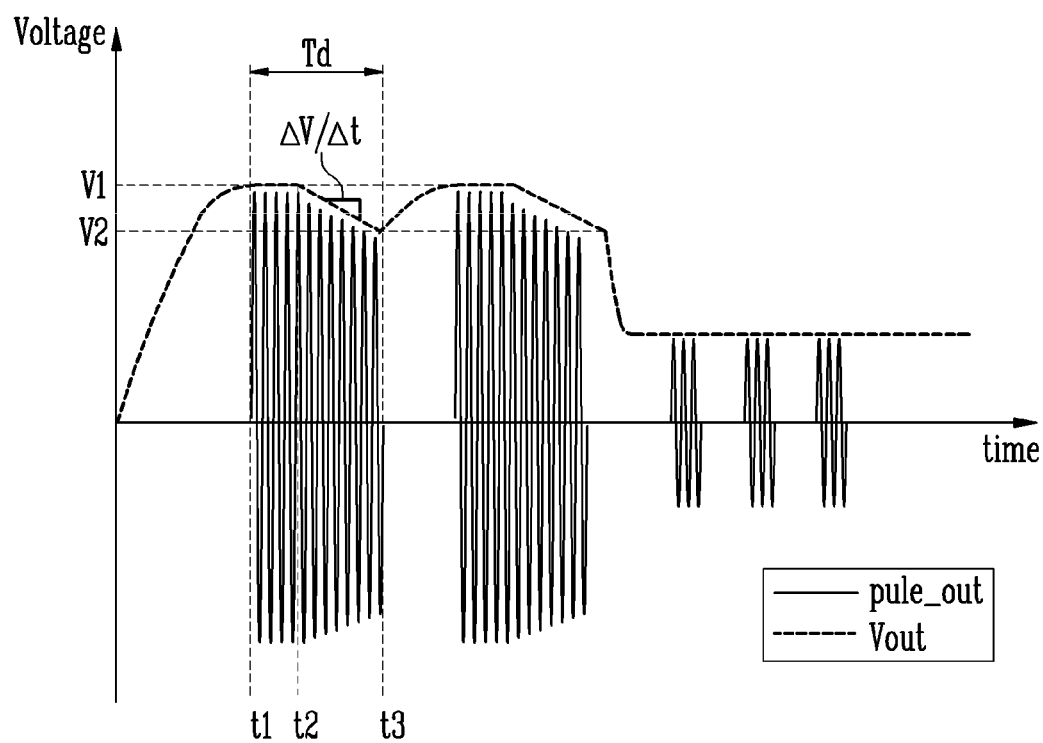
FIG. 6A is a diagram for specifically illustrating compensation information.

FIG. 6A is a diagram for specifically illustrating compensation information.

Referring to FIGS. 5A and 6A, the test voltage Vtest provided from the variable voltage supply unit 320 to the transmission circuit 330 may gradually increase to reach the first voltage V1 at t1. At t1, the transmission circuit 330 may generate and output a driving pulse signal pulse_out using the test voltage Vtest. The driving pulse signal pulse_out may be output from t1 to t3. In other words, the driving pulse signal pulse_out may be output for a duration of Td. The level of the test voltage Vtest may maintain the level of the first voltage V1 and begin to decrease from t2. The level of the test voltage Vtest may decrease to t3, the point at which the output of the driving pulse signal pulse_out stops. Here, the level of the test voltage may be a second voltage V2. The driving pulse signal pulse_out may be output repeatedly multiple times. In other words, in FIG. 6A, the driving pulse signal pulse_out is shown as if it is output twice repeatedly, but the number of times the driving pulse signal pulse_out is repeatedly output is not limited thereto, and may be repeatedly output twice or more. The number of times the driving pulse signal pulse_out is output may be preset in advance.

Referring to FIGS. 5B and 6A, the controller 310 may generate compensation information comp_inf based on receiving a test voltage Vtest output from the variable voltage supply unit 320. Specifically, the controller 310 may receive the test voltage Vtest output from the variable voltage supply unit 320 and generate compensation information comp_inf based on this. The controller 310 may continuously receive the test voltage Vtest or generate compensation information comp_inf by sampling every predetermined period.

The compensation information comp_inf may include information on a time point at which the test voltage Vtest starts to drop from the first voltage V1, time point at which the test voltage Vtest begins to drop from the first voltage V1, information on an amount of voltage drop V2-V1 during td of the test voltage Vtest, and information on the amount of change over time ΔV/Δt of the test voltage Vtest level.

Figure 6B:
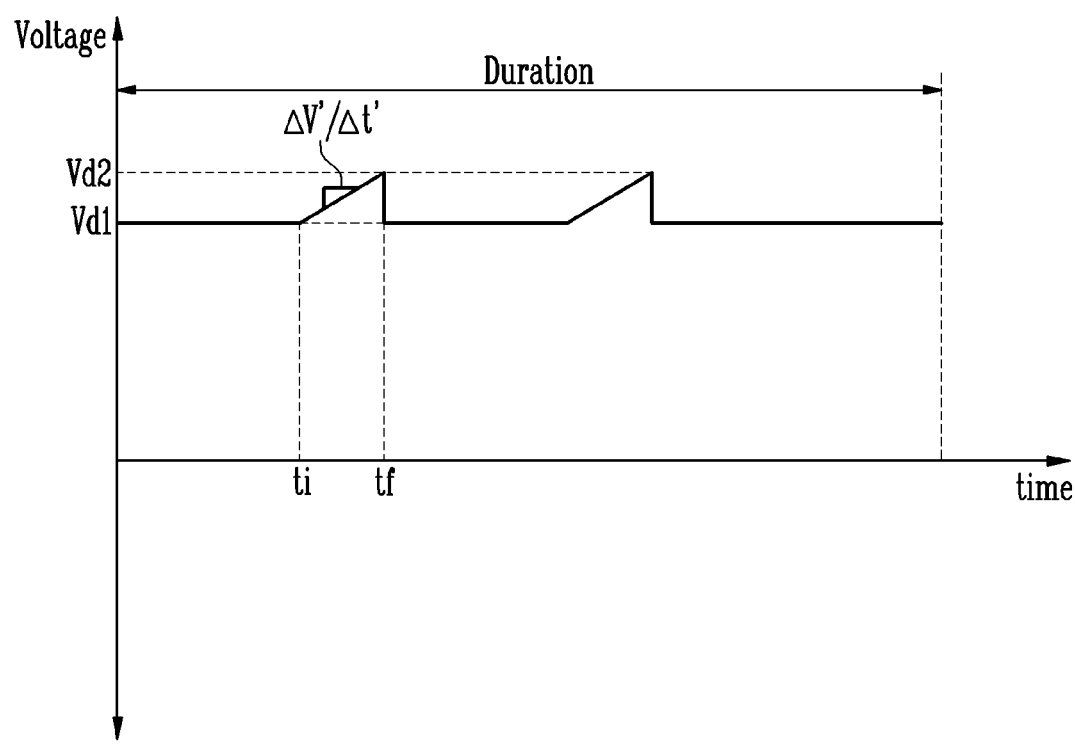
FIG. 6B is a diagram for specifically illustrating information on a compensated driving voltage.

FIG. 6B is a diagram for specifically illustrating information on a compensated driving voltage.

Referring to FIG. 6B, the controller 310 may generate information on the compensated driving voltage based on the compensation information comp_inf. The information on the compensated driving voltage may include information on a target level Vd1 of the compensated driving voltage, information on a duration for which the compensated driving voltage is supplied to the transmission circuit 330, information on a voltage rising time point ts at which the compensated driving voltage starts to rise from the target level, information on a time point ts at which a level of the compensated driving voltage decreases to the target level again, information on an amount of voltage rise Vd2-Vd1 of the compensated driving voltage, and information on an amount of change ΔV'/Δt' of the compensated driving voltage over time.

The target level may be a level of a preset driving voltage so that the transmission circuit 330 can output a driving pulse signal pulse_out of a target amplitude.

Figure 7:
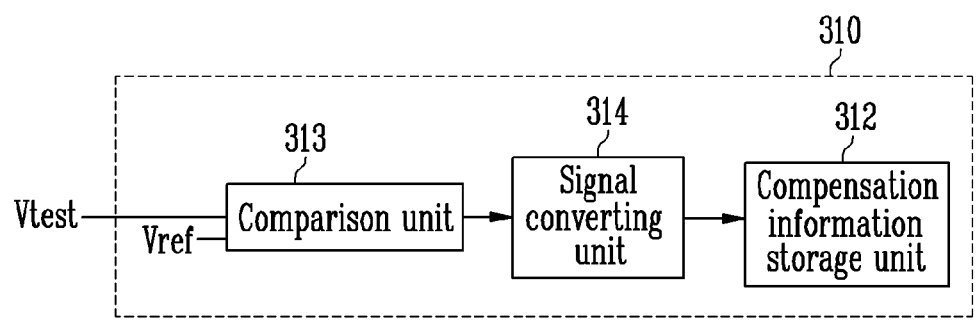
FIG. 7 is a diagram for illustrating an operation of generating compensation information and storing the generated compensation information by an ultrasound diagnosis apparatus in accordance with an embodiment.

FIG. 7 is a diagram for illustrating an operation of generating compensation information and storing the generated compensation information by an ultrasound diagnosis apparatus in accordance with an embodiment.

Referring to FIG. 7, the controller 310 may further include a comparison unit 313 and a signal converting unit 314.

The comparison unit 313 may compare the test voltage Vtest output from the variable voltage supply unit with the reference voltage Vref, and then output information on the difference value between the test voltage Vtest and the reference voltage Vref. The information on the difference value may be an analog signal. The level of the reference voltage Vref may be preset to a level for measuring the amount of voltage drop of the test voltage Vtest. For example, the level of the reference voltage Vref may be the same as the target level of the driving voltage. The target level of the driving voltage may be a preset level so that the transmission circuit can output the driving pulse signal pulse_out of a target amplitude. For example, the level of the reference voltage Vref may be the same as the level of the first voltage V1 of FIG. 6. In an embodiment, the comparison unit 313 may include at least one differential amplification circuit to output the difference value between the test voltage Vtest and the reference voltage Vref.

The signal converting unit 314 may convert information on the difference value received from the comparison unit 313 into a digital signal. To this end, the signal converting unit 314 may include at least one analog-to-digital converter circuit. The controller 310 may generate compensation information comp_inf as described with reference to FIGS. 5A, 5B, and 6 using the converted digital signal, and then store it in the compensation information storage unit 312.

In an embodiment, the operation of generating and storing compensation information may be performed multiple times. For example, the controller 310 may control the variable voltage supply unit so that the same test voltage Vtest is repeatedly output from the variable voltage supply unit. The number of times the test voltage Vtest is repeatedly output may be predetermined.

Specifically, the controller 310 may repeatedly provide a test control signal to the variable voltage supply unit. The controller 310 may receive or sample the test voltage Vtest output from the variable voltage supply unit according to the test control signal as many times as the test control signal is provided.

The controller 310 may generate a plurality of compensation information corresponding to the number of times the test control signal is provided and store it in the compensation information storage unit 312. The controller 310 may calculate an average value or a median value of a plurality of compensation information included in the compensation information storage unit 312. The controller 310 may generate information on the compensated driving voltage based on the average value or a median value of the calculated compensation information. Through this, noise that may occur during compensation information generation can be removed, and the accuracy of compensation information for compensating for the voltage drop of the driving voltage can be improved.

Figure 8:
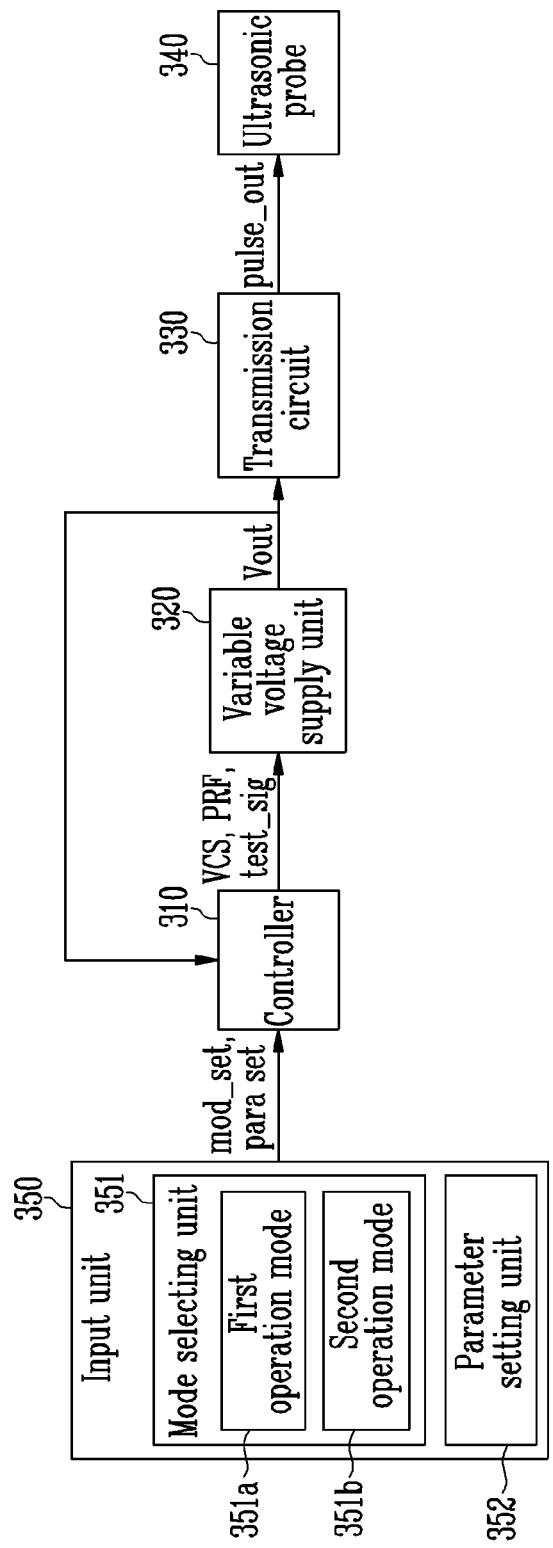
FIG. 8 is a diagram for illustrating a time point at which compensation information is generated in an ultrasound diagnosis apparatus in accordance with an embodiment.

FIG. 8 is a diagram for illustrating a time point at which compensation information is generated in an ultrasound diagnosis apparatus in accordance with an embodiment.

Referring to FIG. 8, the ultrasound diagnosis apparatus according to an embodiment may further include an input unit 350. In FIG. 8, since the operation of the remaining configurations except for the input unit 350 is the same as described with reference to FIGS. 5A and 5B, a description thereof will be omitted.

The input unit 350 may have the same configuration as the input unit 170 of FIG. 1. In an embodiment, the input unit 350 may receive a user's input and provide a command signal corresponding to the user's input to the controller 310. In an embodiment, the input unit 350 may include a mode selection unit 351 and a parameter setting unit 352.

The mode selection unit 351 may be configured to allow the user to select any one mode of the first operation mode 351a and the second operation mode 351b in which a higher power than the first operation mode 351a is used. The second operation mode 351b may be a 2D shear wave elastography mode. The first operation mode 351a may a measurement mode other than the 2D shear wave elastography mode, for example, B mode (brightness mode) or Doppler mode.

The parameter setting unit 352 may be configured to allow the plurality of parameters related to the generation of the ultrasonic signal to be changed by the user's input in the second operation mode 351b. The plurality of parameters may be, for example, parameters related to the focusing of the ultrasonic signal emitted from the ultrasonic probe 340, the parameters related to the depth of the location where the ultrasonic signal is focused within the object and the region of interest (ROI). When the above parameters are changed, the amplitude, width of the driving pulse signal pulse_out, and number of times the driving pulse signal pulse_out are repeatedly output from the transmission circuit 330 may be changed.

The controller 310 may respond to a command signal corresponding to the second operation mode 351b provided from the input unit 350 to generate compensation information described with reference to FIGS. 5A and 6. Specifically, when the input unit 350 receives an input from the user to set or change the operation mode of the ultrasound diagnosis apparatus to the second operation mode 351b, the input unit 350 may provide a mode setting signal mod_set to the controller 310. After performing an operation of generating compensation information in response to the mode setting signal mod_set, the controller 310 may control the variable voltage supply unit 320 so that a compensated driving voltage based on the generated compensation information is provided to the transmission circuit.

The controller 310 may perform an operation in the second operation mode 351b to generate the compensation information whenever at least any one of the plurality of parameters is changed by the user. Specifically, when the input unit 350 receives an input from the user to change at least any one of the plurality of parameters in the second operation mode 351b, the input unit 350 may provide a parameter setting signal para_set to the controller 310. After the controller 310 performs the operation of generating compensation information in response to the parameter setting signal para_set, the variable voltage supply unit 320 may be controlled so that the compensated driving voltage based on the generated compensation information is provided to the transmission circuit.

Figure 9:
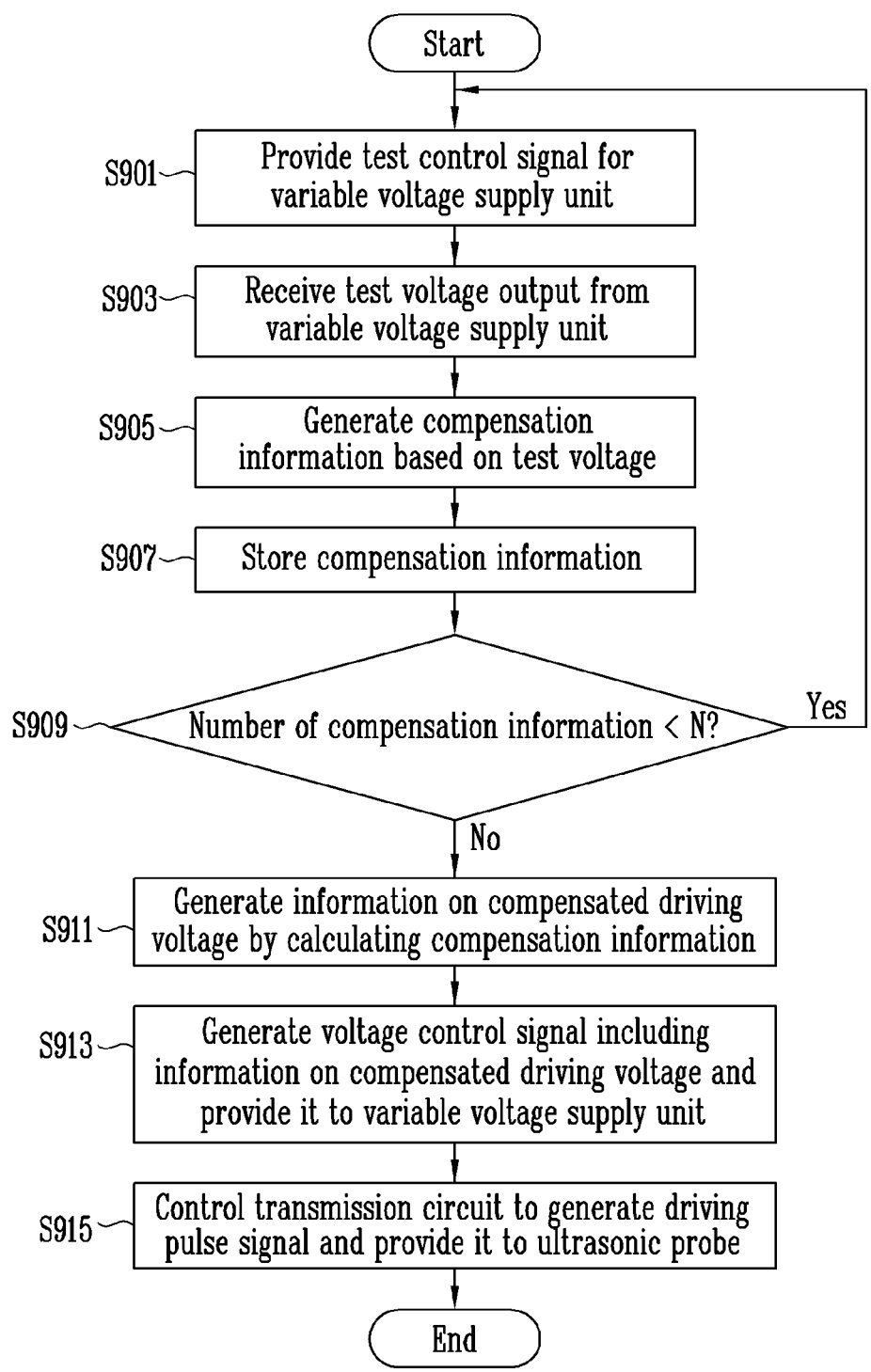
FIG. 9 is a flowchart for specifically illustrating an operation of a controller of an ultrasound diagnosis apparatus in accordance with an embodiment.

FIG. 9 is a flowchart for specifically illustrating an operation of a controller of an ultrasound diagnosis apparatus in accordance with an embodiment.

In step S901, the controller may provide a test control signal for the variable voltage supply unit. The test control signal may include information on the level of the test voltage supplied to the transmission circuit and information on the duration of the test voltage.

In step S903, the controller may receive a test voltage output from the variable voltage supply unit.

In step S905, the controller may generate compensation information based on the test voltage. The compensation information may include information on a time point at which the test voltage starts to drop information on an amount of voltage drop of the test voltage, and information on an amount of change of the test voltage over time.

In step S907, the controller may store the generated compensation information in the compensation information storage unit.

In step S909, the controller may determine whether the number of compensation information stored in the compensation information storage unit is less than a predetermined N. When the number of compensation information stored in the compensation information storage unit is less than N, the controller may perform steps S901 to S907 again.

When the number of compensation information stored in the compensation information storage unit is not less than N, the controller may generate information on the compensated driving voltage by calculating the compensation information stored in the compensation information storage unit in step S911. The operation of calculating the compensation information may be an operation of calculating an average value or a median value of the compensation information.

In step S913, a voltage control signal including information on the compensated driving voltage may be provided to the variable voltage supply unit. The variable voltage supply unit may generate a compensated driving voltage based on the voltage control signal received from the controller and provide it to the transmission circuit.

In step S915, the controller may control the transmission circuit to generate a driving pulse signal using the driving voltage received by the transmission circuit from the variable voltage supply unit and provide it to the ultrasonic probe.

Figure 10A:
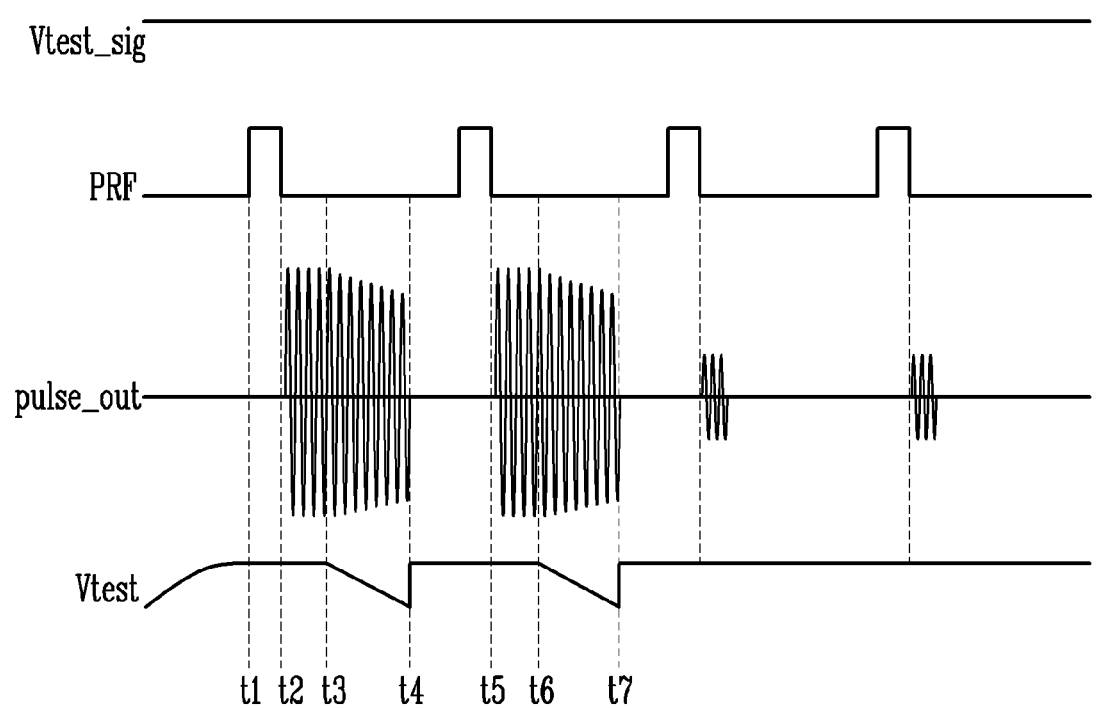
FIGS. 10A and 10B are timing diagrams illustrating changes over time of a voltage output from a variable voltage supply unit and a pulse output from a transmission circuit in accordance with an embodiment.
Figure 10B:
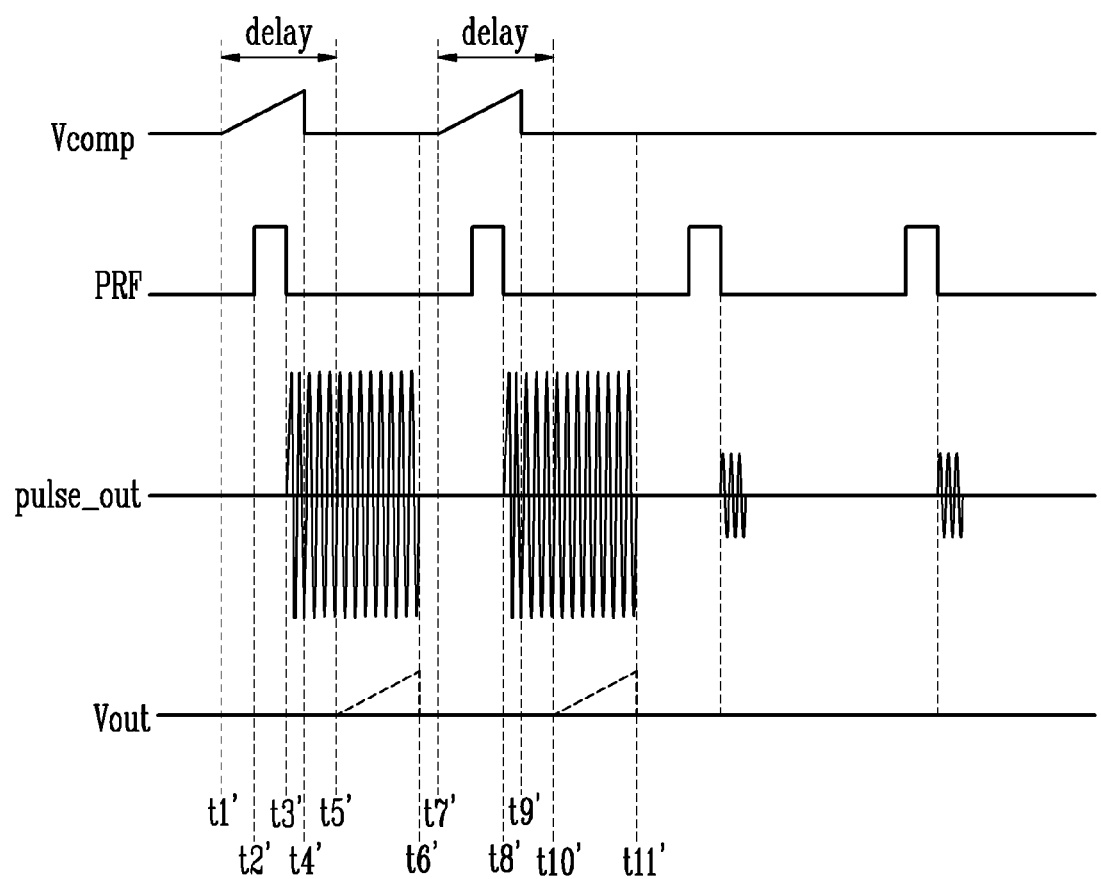

FIGS. 10A and 10B are timing diagrams illustrating changes over time of a voltage output from a variable voltage supply unit and a pulse output from a transmission circuit in accordance with an embodiment.

'Vtest_sig' in FIG. 10A may represent information on the test voltage Vtest included in the test control signal, and 'Vcomp' in FIG. 10B may represent information on the compensated driving voltage included in the voltage control signal. The test control signal and the voltage control signal may be control signals provided from the controller 310 to the variable voltage supply unit 320 as described in FIGS. 5A and 5B. In FIGS. 10A and 10B, information Vtest_sig on the test voltage and information Vcomp on the compensated driving voltage are each represented as analog signals for convenience of description, but in reality, may be digital signals including information on the voltage level represented in FIGS. 10A and 10B.

Referring to FIGS. 5A and 10A, the magnitude of the test voltage included in the information Vtest_sig on the test voltage can maintain a constant level without changing over time.

At t1, a pulse repetition frequency signal PRF may be provided from the controller 310 to the transmission circuit 330. The transmission circuit 330 may output a driving pulse signal pulse_out at t2, which is a time point corresponding to the falling edge of the pulse repetition frequency signal PRF.

At t3, the level of the test voltage Vtest supplied from the variable voltage supply unit 320 to the transmission circuit 330 may begin to decrease. Accordingly, the amplitude of the driving pulse signal pulse_out output from the transmission circuit 330 may also decrease. The level of the test voltage Vtest and the amplitude of the driving pulse signal pulse_out may gradually decrease over time.

At t4, the transmission circuit 330 may interrupt the output of the driving pulse signal pulse_out according to the control of the controller 310. Accordingly, the level of the test voltage Vtest provided from the variable voltage supply unit 320 to the transmission circuit 330 may increase again.

At t5, which is a time point corresponding to the next falling edge of the pulse repetition frequency signal PRF, the transmission circuit 330 may output the driving pulse signal pulse_out again.

The level of the test voltage Vtest and the amplitude of the driving pulse signal pulse_out from t5 to t7 may be the same as the level of the test voltage Vtest and the amplitude of the driving pulse signal pulse_out from t2 to t4, respectively.

Referring to FIGS. 5B, 10A, and 10B, in the information Vcomp on the compensated driving voltage included in the voltage control signal VCS, the compensated driving voltage may gradually rise from a certain time point and then decrease again. When the level of the compensated driving voltage is not constant and changes with time, time may be required for the voltage controller 321 to stabilize the output of the voltage after receiving the voltage control signal VCS. Therefore, in this case, the voltage control signal VCS including the information Vcomp on the compensated driving voltage, considering the time for stabilizing the output of the voltage, may be provided to the voltage controller 321 prior to the actual compensation time point by a predetermined delay time.

t5', t6', t10' and t11' of FIG. 10B may be the same time points as t3, t4, t6 and t7 of FIG. 10A, respectively.

t1' and t7' which are time points at which the level of the compensated driving voltage rises, and t4' and t9' which are time points at which the level of the compensated driving voltage decreases again may be determined by the controller 310 based on the compensation information, the pulse repetition frequency signal PRF, and the clock signal. For example, the controller 310 may, in FIG. 10A, based on t2 which is a time point corresponding to the falling edge of the pulse repetition frequency signal PRF, t3 which is a time point at which the level of the test voltage Vtest decreases, and the delay, may determine t1' which is a time point at which the level of the compensated driving voltage rises and t4' which is a time point at which the level of the compensated driving voltage decreases again. To this end, the controller 310 may further include a separate counter circuit (not shown). The compensated driving voltage rises at t1' and t7', but depending on the delay, the time point at which the rise in the driving voltage is actually reflected in the output voltage Vout may be t5' and t10'. Similarly, the compensated driving voltage drops at t4' and t9', but depending on the delay, the time point at which the drop of the driving voltage is actually reflected in the output voltage Vout may be t6' and t11'. Referring to FIGS. 5B and 10B, according to the information Vcomp on the compensated driving voltage included in the voltage control signal VCS, as the voltage drop of the driving voltage is compensated in advance, the level of the output voltage Vout actually output from the variable voltage supply unit 320 to the transmission circuit 330 may be maintained constant without decreasing over time.

Figure 11A:
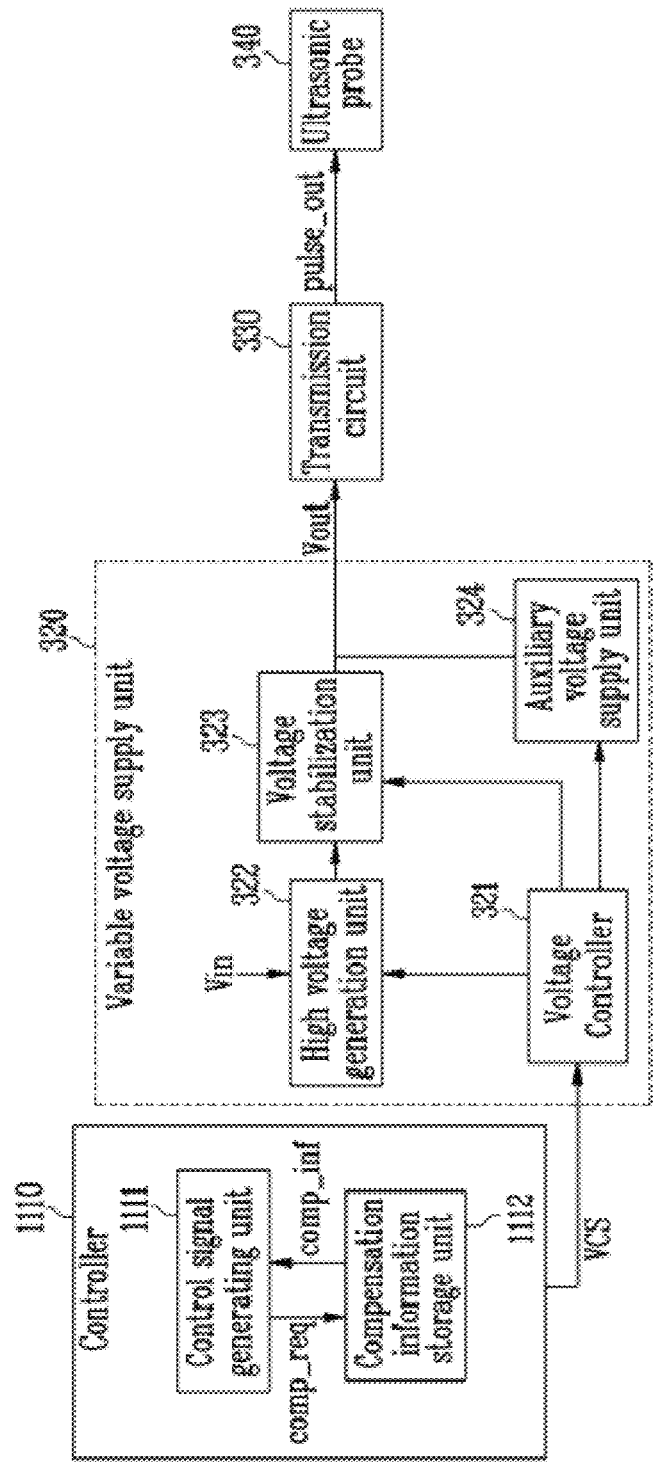
FIGS. 11A and 11B are diagrams for illustrating an operation of an ultrasound diagnosis apparatus in accordance with another embodiment.
Figures 11B, 12:
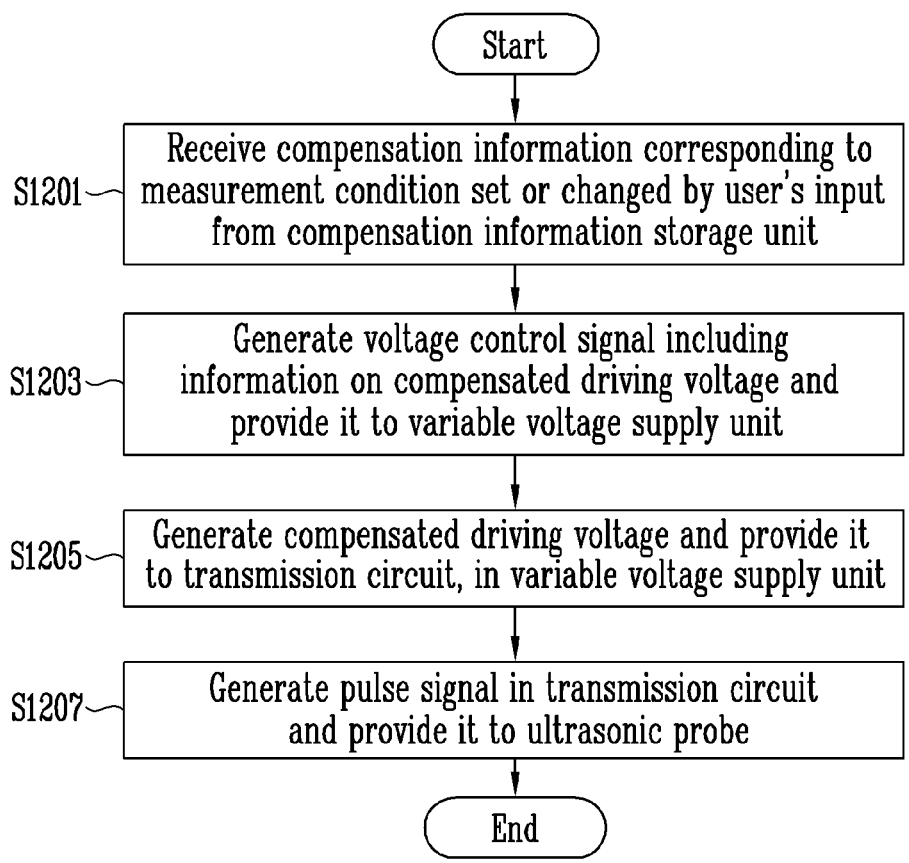
FIG. 12 is a flowchart for illustrating an operation of an ultrasound diagnosis apparatus in accordance with another embodiment illustrated in FIGS. 11A and 11B.

FIGS. 11A and 11B are diagrams for illustrating an operation of an ultrasound diagnosis apparatus in accordance with another embodiment.

In another embodiment, the ultrasound diagnosis apparatus may not perform the operation of generating compensation information, unlike the embodiment described in FIG. 5A. Instead, based on the compensation information comp_inf stored in advance in the compensation information storage unit 1112, a compensated driving voltage may be generated and provided to the transmission circuit.

Specifically, referring to FIG. 11A, the controller 1110 may, based on the compensation information comp_inf included in the compensation information storage unit 1112, generate a voltage control signal VCS including information on the compensated driving voltage and provide to the variable voltage supply unit 320. The compensation information comp_inf may be obtained through a preliminary test prior to shipment of the ultrasound diagnosis apparatus and then stored in the compensation information storage unit 1112. Specifically, the control signal generating unit 1111 may provide a compensation information request signal comp_sig to the compensation information storage unit 1112. The compensation information storage unit 1112 may provide the compensation information comp_inf to the control signal generating unit 1111 in response to the compensation information request signal comp_sig. The control signal generating unit 1111 may generate a voltage control signal VCS including information on the compensated driving voltage based on the compensation information comp_inf. The controller 1110 may provide the generated voltage control signal VCS to the variable voltage supply unit.

Referring to FIG. 11B, the compensation information storage unit 1112 of FIG. 11A may include a plurality of measurement conditions for transmitting an ultrasonic signal for an object and compensation information for each of the plurality of measurement conditions. The plurality of measurement conditions may include conditions for region of interest (ROI) and the focusing depth of the ultrasonic signal. In other words, in FIG. 11B, each of the plurality of measurement conditions may have values for different ROI and focusing depths, and different compensation information may be stored for each condition. The compensation information of FIG. 11B may be the same as the compensation information of FIG. 6A. However, in the case of the ultrasound diagnosis apparatus according to the embodiment of FIGS. 11A and 11B, before shipment of the ultrasound apparatus, compensation information according to each condition may be obtained in advance through a preliminary test for each condition, and then stored in the compensation information storage unit 1112. The measurement condition may be set or changed by the user's input through the input unit 170 of FIG. 1.

FIG. 12 is a flowchart for illustrating an operation of an ultrasound diagnosis apparatus in accordance with another embodiment illustrated in FIGS. 11A and 11B.

In step S1201, the controller may receive compensation information corresponding to the measurement condition set or changed by the user's input from the compensation information storage unit.

In step S1203, the controller may generate a voltage control signal including information on the compensated driving voltage based on the compensation information received from the compensation information storage unit and provide to the variable voltage supply unit.

In step S1205, the variable voltage supply unit may, according to the voltage control signal received from the controller, generate a compensated driving voltage and provide to the transmission circuit.

In step S1207, the transmission circuit may generate a pulse signal and provide to the ultrasonic probe.

Figure 13:
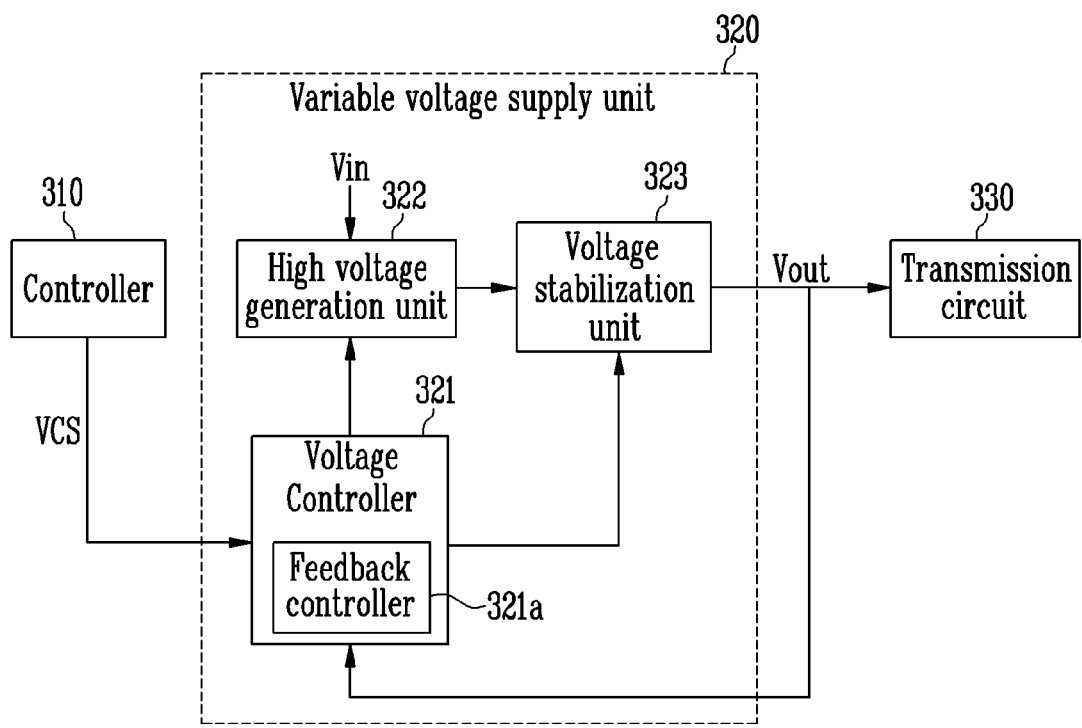
FIG. 13 is a diagram for illustrating a difference between a compensation operation and a feedback control operation of an ultrasound diagnosis apparatus in accordance with an embodiment.

FIG. 13 is a diagram for illustrating a difference between a compensation operation and a feedback control operation of an ultrasound diagnosis apparatus in accordance with an embodiment.

Referring to FIG. 13, the voltage controller 321 may include a feedback controller 321a. The feedback controller 321a may receive the output voltage Vout output from the variable voltage supply unit 320 while the ultrasound diagnosis apparatus is operating, and then compare the level of the output voltage Vout with the level of the target driving voltage. When the level of the output voltage Vout is different from the level of the target driving voltage, the feedback controller 321a may control the high voltage generation unit 322 so that the level of the output voltage Vout is the same as the level of the target driving voltage. For example, the feedback controller 321a may, when the level of the output voltage Vout is smaller than the level of the target driving voltage, control the high voltage generation unit 322 to output a higher level of voltage, and when the level of the output voltage Vout is higher than the level of the target driving voltage, control the high voltage generation unit 322 to output a lower level voltage.

In the case of a feedback control operation, it may be difficult to fully compensate for the voltage drop of the output voltage Vout because the difference between the target driving voltage and the output voltage Vout is compensated based on the voltage already output. In addition, in the case of a feedback control operation, a stabilization time of tens to hundreds of us may be required by parasitic components such as resistors, inductors, and capacitors included in the variable voltage supply unit 320. In particular, in the case of 2D shear wave elastography mode of the ultrasound diagnosis apparatus, since the driving pulse of the high voltage is repeatedly output for a short time (tens to hundreds of us), it may be difficult to compensate for the drop in the output voltage Vout using only feedback control.

According to embodiments of the present disclosure, the controller in the ultrasound diagnosis apparatus system may store compensation information for compensating for a voltage drop in the driving voltage, and may compensate for the voltage drop in the driving voltage in advance based on the stored compensation information. In other words, according to embodiments of the present disclosure, since the driving voltage is compensated in advance before output, a stabilization time may not be required to compensate for the voltage drop of the driving voltage, and a driving voltage of a constant magnitude may be stably provided for the transmission circuit from the beginning. As described above, the disclosed embodiments have been described with reference to the accompanying drawings. Those of ordinary skill in the art to which the present invention pertains will understand that the present invention may be practiced in a form different from the disclosed embodiments without changing the technical spirit or essential features of the present invention. The disclosed embodiments are illustrative and should not be construed as limiting.

What is claimed is:

1. An ultrasound diagnosis apparatus, comprising:
   a variable voltage supply unit, comprising circuitry, configured to supply a driving voltage;
   a transmission circuit configured to generate a pulse signal for generating an ultrasonic signal using the driving voltage; and
   a controller configured to store compensation information for compensating for a voltage drop of the driving voltage and to provide a voltage control signal comprising information on a driving voltage for which the voltage drop is compensated for based on the compensation information to the variable voltage supply unit,
   wherein the variable voltage supply unit is configured to supply the compensated driving voltage to the transmission circuit in response to the voltage control signal, and
   wherein the compensation information comprises information on a time point of voltage drop of the driving voltage and information on an amount of voltage drop of the driving voltage,
   wherein the controller is configured to provide a test control signal comprising information on a test voltage having a predetermined voltage magnitude and a predetermined duration to the variable voltage supply unit, and generate the compensation information based on the test voltage output from the variable voltage supply unit according to the test control signal, and
   wherein the information on an amount of voltage drop of the driving voltage corresponds to information on an amount of voltage drop of the test voltage.

2. The ultrasound diagnosis apparatus of claim 1, wherein the variable voltage supply unit is configured to generate the test voltage in response to the test control signal and then output the test voltage to the controller.

3. The ultrasound diagnosis apparatus of claim 2, wherein the compensation information comprises:
   information on a time point at which the test voltage starts to drop from the predetermined voltage magnitude; and
   information on an amount of change of the test voltage over time.

4. The ultrasound diagnosis apparatus of claim 2, wherein the information on the compensated driving voltage comprises:
   information on a target level of the compensated driving voltage;
   information on a duration for which the compensated driving voltage is supplied to the transmission circuit;
   information on a voltage rising time point at which the compensated driving voltage starts to rise from the target level;
   information on a time point at which a level of the compensated driving voltage decreases to the target level again;
   information on an amount of voltage rise of the compensated driving voltage; and
   information on an amount of change of the compensated driving voltage over time.

5. The ultrasound diagnosis apparatus of claim 4, wherein the variable voltage supply unit comprises:
   a high voltage generation unit, comprising circuitry, configured to receive an input voltage input from an outside and boost the input voltage to a first voltage equal to or higher than levels of the test voltage and the compensated driving voltage;
a voltage stabilization unit, comprising circuitry, configured to drop or stabilize the first voltage received from the high voltage generation unit to generate a second voltage having the same magnitude as the test voltage and the compensated driving voltage; and
a voltage controller configured to control the high voltage generation unit and the voltage stabilization unit based on the test control signal or the voltage control signal received from the controller,
wherein the voltage controller is configured to control the high voltage generation unit and the voltage stabilization unit so that the magnitude of the first voltage gradually rises from a time point corresponding to the voltage rising time point based on the voltage control signal.

6. The ultrasound diagnosis apparatus of claim 2, wherein the controller comprises:
a compensation information storage unit, comprising at least one memory, configured to store the compensation information; and a control signal generating unit, comprising at least one processor, configured to receive the compensation information from the compensation information storage unit and generate the voltage control signal comprising the information on the compensated driving voltage.

7. The ultrasound diagnosis apparatus of claim 1, further comprising:
an input unit, comprising at least one of a key or a touch screen, configured to receive at least one user's input and provide a command signal corresponding to the user's input to the controller,
wherein the input unit is configured to receive a user's input to select any one mode of a first operation mode and a second operation mode in which power higher than that of the first operation mode is used, and
the controller is configured to perform an operation of generating the compensation information in response to a command signal corresponding to the second operation mode provided from the input unit.

8. The ultrasound diagnosis apparatus of claim 7, wherein the input unit is further configured to receive a user's input to change at least one of the plurality of parameters related to the generation of the ultrasonic signal,
wherein the controller is configured to, in the second operation mode, perform the operation of generating the compensation information whenever the user's input to change at least one of the plurality of parameters is received.

9. The ultrasound diagnosis apparatus of claim 1, further comprising:
an input unit comprising at least one of a key or a touch screen, configured to receive a user's input which set or change at least one of a plurality of parameters related to the generation of the ultrasonic signal,
wherein the controller comprises a compensation information storage unit, comprising at least one memory, in which the compensation information is stored, and the compensation information comprises a plurality of measurement conditions for transmitting an ultrasonic signal for an object and the compensation information for each of the plurality of measurement conditions, and
the controller comprises a control signal generating unit, comprising at least one processor, configured to receive compensation information for, among the plurality of measurement conditions stored in the compensation information storage unit, a measurement condition corresponding to the plurality of parameters set or changed by the user's input from the compensation information storage unit, and to generate information on the compensated driving voltage.

10. A method of generating a pulse signal for generating an ultrasonic signal, the method comprising:
storing compensation information for compensating for a voltage drop of a driving voltage;
generating information on a driving voltage for which the voltage drop is compensated for based on the compensation information;
generating a compensated driving voltage based on the information on the compensated driving voltage;
generating the pulse signal using the compensated driving voltage; providing a test control signal comprising information on a test voltage having a predetermined voltage magnitude and a predetermined duration to a variable voltage supply unit; and
generating the compensation information based on the test voltage output from the variable voltage supply unit according to the test control signal,
wherein the compensation information comprises information on a time point of voltage drop of the driving voltage and information on an amount of voltage drop of the driving voltage, and the information on an amount of voltage drop of the driving voltage corresponds to information on an amount of voltage drop of the test voltage.

11. The method of claim 10, wherein the compensation information comprises:
information on a time point at which the test voltage starts to drop from the predetermined voltage magnitude; and
information on an amount of change of the test voltage over time.

12. The method of claim 10, wherein the information on the compensated driving voltage comprises:
information on a target magnitude of the compensated driving voltage;
information on a duration for which the compensated driving voltage is supplied to a transmission circuit generating the pulse signal;
information on a voltage rising time point at which the compensated driving voltage starts to rise from the target magnitude;
information on an amount of voltage rise of the compensated driving voltage; and
information on an amount of change of the compensated driving voltage over time.

13. The method of claim 10, wherein the storing of the compensation information comprises storing a plurality of measurement conditions for transmitting an ultrasonic signal for an object and the compensation information for each of the plurality of measurement conditions in a compensation information storage unit comprising at least one memory.

14. The method of claim 13, further comprising:
receiving a user's input for setting or changing a plurality of parameters related to the generation of the ultrasonic signal,
wherein the generating of the information on the compensated driving voltage comprises, by receiving compensation information for, among the plurality of measurement conditions stored in the compensation information storage unit, a measurement condition corresponding to the plurality of parameters set or changed by the user's input from the compensation information storage unit, generating information on the compensated driving voltage corresponding to the set or changed plurality of parameters.

\* \* \* \* \*